(12) United States Patent
Sommerlatt

(10) Patent No.: US 11,195,408 B1
(45) Date of Patent: Dec. 7, 2021

(54) SENDING SIGNALS FOR HELP DURING AN EMERGENCY EVENT

(71) Applicant: Amazon Technologies, Inc., Seattle, WA (US)

(72) Inventor: Darrell Sommerlatt, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/004,878

(22) Filed: Aug. 27, 2020

Related U.S. Application Data

(62) Division of application No. 16/368,651, filed on Mar. 28, 2019, now Pat. No. 10,762,769.

(51) Int. Cl.
| | | |
|---|---|---|
| G08B 25/12 | (2006.01) | |
| G08B 21/02 | (2006.01) | |
| G08B 13/196 | (2006.01) | |
| G08B 25/10 | (2006.01) | |
| H04W 4/90 | (2018.01) | |

(52) U.S. Cl.
CPC ....... G08B 25/12 (2013.01); G08B 13/19684 (2013.01); G08B 21/02 (2013.01); G08B 25/10 (2013.01); H04W 4/90 (2018.02)

(58) Field of Classification Search
CPC .. G08B 25/12; G08B 13/19684; G08B 21/02; G08B 5/10; H04W 4/90
See application file for complete search history.

(56) References Cited

U.S. PATENT DOCUMENTS

| | | |
|---|---|---|
| 6,529,137 B1 | 3/2003 | Roe |
| 7,027,808 B2 | 4/2006 | Wesby |
| 7,924,149 B2 | 4/2011 | Mendelson |
| 8,504,103 B2 | 8/2013 | Ficquette |
| 8,624,727 B2 | 1/2014 | Saigh et al. |
| 9,000,887 B2 | 4/2015 | Linsky et al. |
| 10,003,918 B1* | 6/2018 | Tudor ............... H04W 4/029 |
| 10,489,453 B2 | 11/2019 | Duda et al. |
| 10,762,769 B1* | 9/2020 | Sommerlatt ..... G08B 13/19684 |
| 2003/0025599 A1* | 2/2003 | Monroe .......... G08B 13/19684 340/531 |
| 2005/0253706 A1 | 11/2005 | Spoltore et al. |
| 2008/0129498 A1 | 6/2008 | Howarter et al. |
| 2008/0284580 A1 | 11/2008 | Babich et al. |
| 2009/0045952 A1 | 2/2009 | Bahari |
| 2011/0230161 A1 | 9/2011 | Newman |
| 2012/0075465 A1 | 3/2012 | Wengrovitz et al. |
| 2012/0098969 A1* | 4/2012 | Wengrovitz .......... H04N 7/181 348/159 |

(Continued)

OTHER PUBLICATIONS

Silent call procedure_Mass.gov, https://www.mass.gov/service-details/silent-call-procedure, accessed Jan. 6, 2019, 3 pgs.

*Primary Examiner* — Ojiako K Nwugo
(74) *Attorney, Agent, or Firm* — Greenberg Traurig, LLP

(57) ABSTRACT

A method for requesting help during an emergency event using a client device. The client device shows live video of the emergency event and provides a GUI element (e.g., panic button) in the GUI after receiving an input such as a touch gesture or keyboard input from the user. The user may select the button in the GUI to simultaneously request help from emergency services and neighbors. The request for help includes a link to view the live video.

20 Claims, 21 Drawing Sheets

(56) References Cited

U.S. PATENT DOCUMENTS

| | | |
|---|---|---|
| 2013/0183924 A1 | 7/2013 | Saigh |
| 2014/0098176 A1* | 4/2014 | Isaacs .................... H04L 67/20 348/14.01 |
| 2014/0313034 A1 | 10/2014 | Dodson |
| 2014/0368337 A1 | 12/2014 | Venkatachari |
| 2015/0035987 A1 | 2/2015 | Fernandez |
| 2015/0116113 A1 | 4/2015 | Caine et al. |
| 2015/0117619 A1 | 4/2015 | Carpenter et al. |
| 2015/0130592 A1 | 5/2015 | Lakshminarayanan |
| 2015/0296077 A1 | 10/2015 | Wakeyama et al. |
| 2015/0348387 A1 | 12/2015 | Sheflin et al. |
| 2016/0065414 A1* | 3/2016 | Sundermeyer .......... H04L 43/04 370/254 |
| 2016/0104368 A1 | 4/2016 | Sullivan et al. |
| 2016/0125725 A1 | 5/2016 | Sager et al. |
| 2016/0149719 A1 | 5/2016 | Wada |
| 2016/0149720 A1 | 5/2016 | Hatae et al. |
| 2016/0189459 A1 | 6/2016 | Johnson et al. |
| 2016/0234868 A1 | 8/2016 | Gill et al. |
| 2016/0343239 A1 | 11/2016 | Lamb |
| 2016/0345171 A1 | 11/2016 | Kulkarni et al. |
| 2016/0364617 A1 | 12/2016 | Silberschatz et al. |
| 2017/0086050 A1 | 3/2017 | Kerning et al. |
| 2017/0097621 A1* | 4/2017 | Ackmann .......... G05B 19/0426 |
| 2017/0148241 A1 | 5/2017 | Kerning et al. |
| 2017/0186290 A1* | 6/2017 | Li .................... G08B 13/19645 |
| 2017/0272269 A1 | 9/2017 | Siminoff |
| 2017/0289450 A1 | 10/2017 | Lemberger |
| 2018/0146169 A1 | 5/2018 | Siminoff et al. |
| 2018/0184152 A1 | 6/2018 | Kirkpatrick et al. |
| 2018/0350225 A1 | 12/2018 | Siminoff et al. |
| 2019/0007377 A1* | 1/2019 | Bender ................ H04W 12/02 |
| 2019/0019293 A1 | 1/2019 | Woodroffe |
| 2020/0008029 A1 | 1/2020 | Cao |
| 2020/0097503 A1 | 3/2020 | Zhao et al. |

* cited by examiner

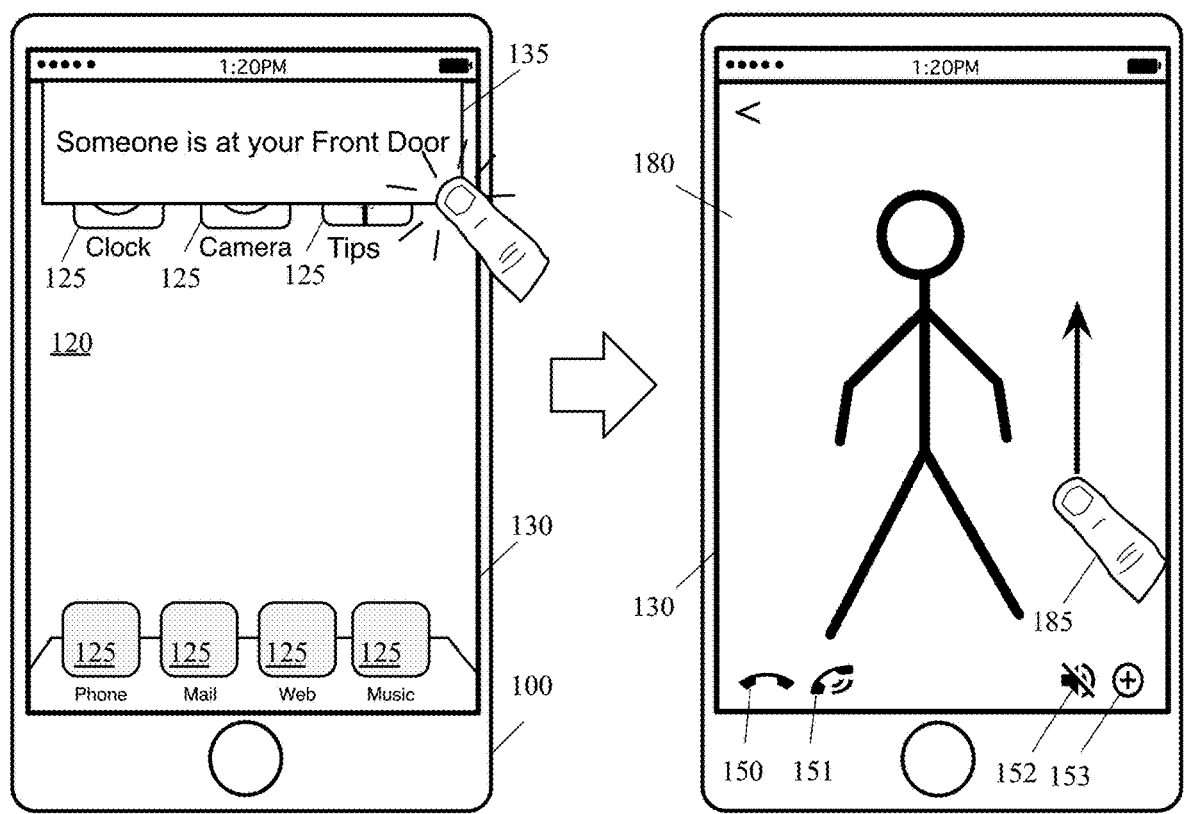
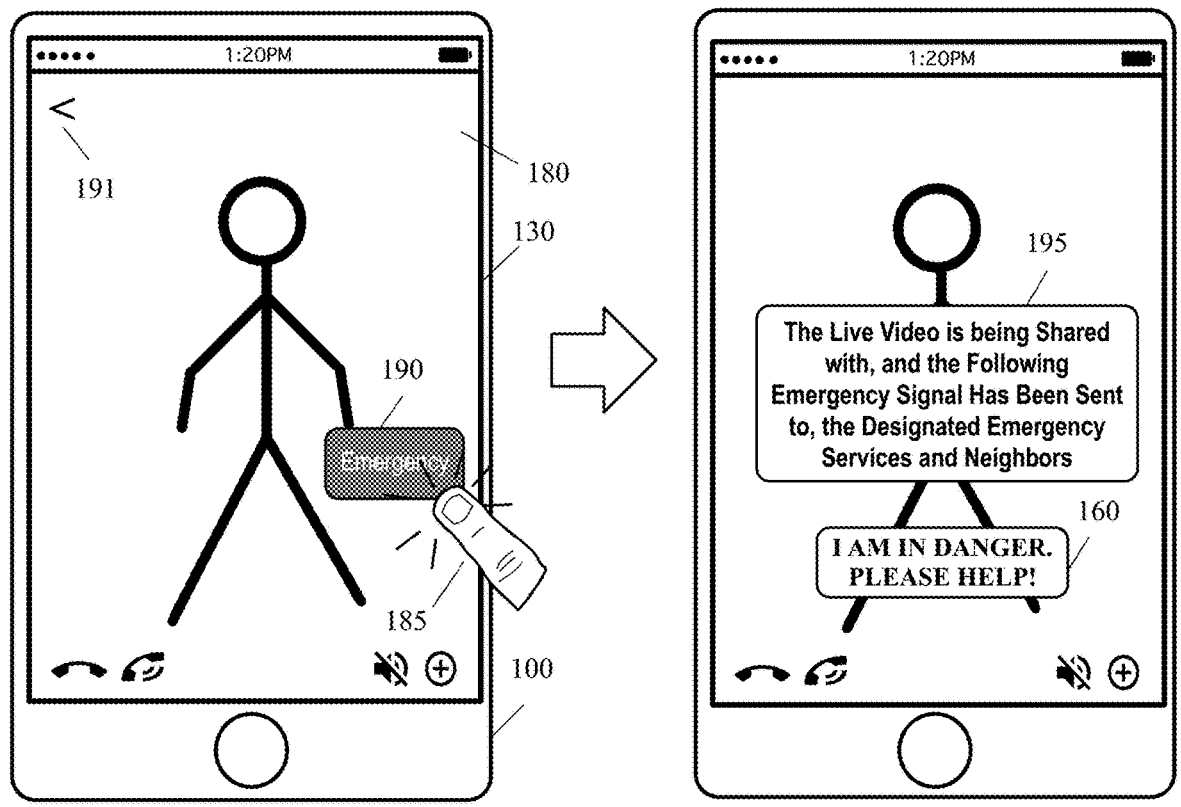
Fig. 1A

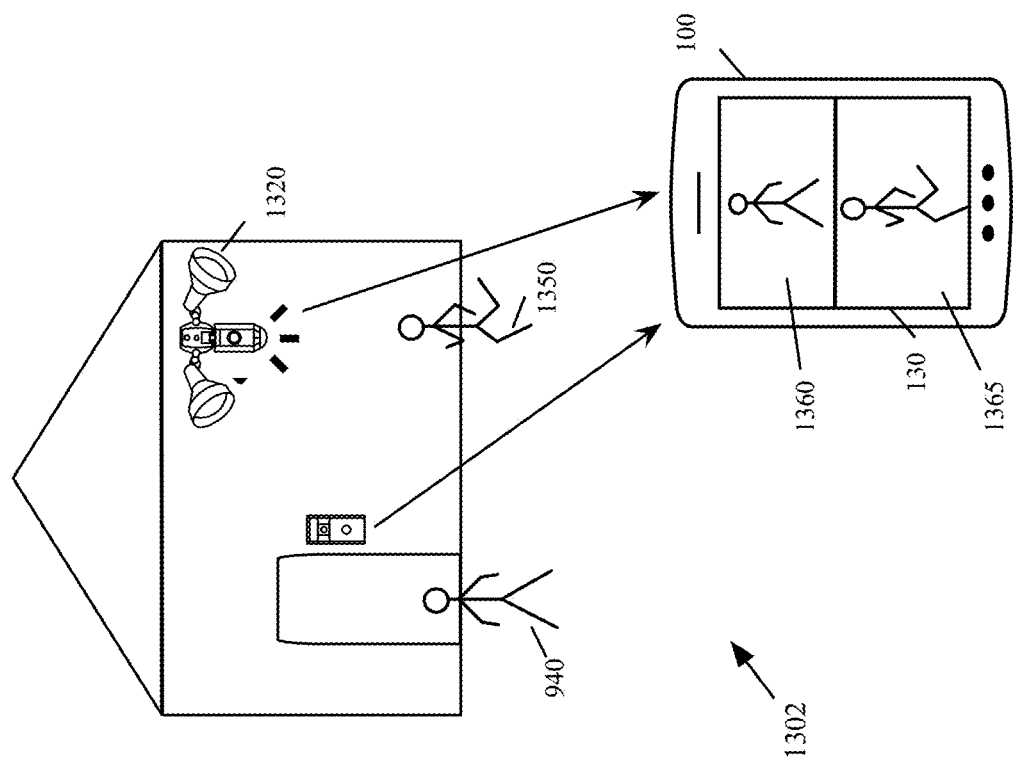
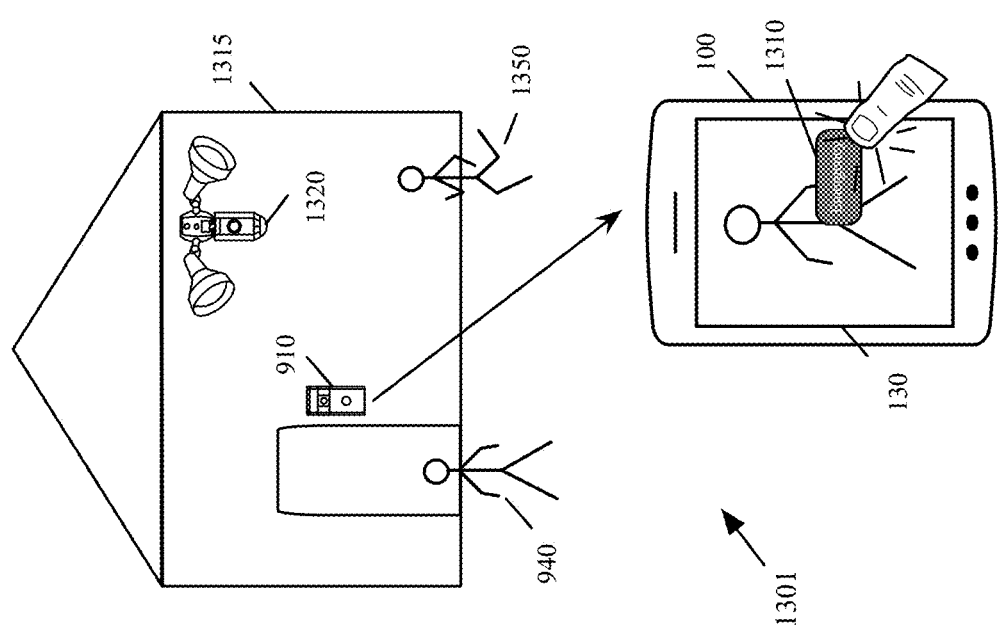
Fig. 13

SENDING SIGNALS FOR HELP DURING AN EMERGENCY EVENT

CROSS REFERENCE TO RELATED MATTERS

This application is a divisional of U.S. patent application Ser. No. 16/368,651 filed Mar. 28, 2019, which is hereby incorporated by reference in its entirety.

BACKGROUND

Home security is a concern for many homeowners and renters. Those seeking to protect or monitor their homes often wish to have video and audio communications with visitors, for example, those visiting an external door or entryway. A/V recording and communication devices, such as doorbells, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

BRIEF DESCRIPTION OF THE DRAWINGS

The various embodiments of the present sending signals for help during an emergency event now will be discussed in detail with an emphasis on highlighting the advantageous features. These embodiments depict the novel and non-obvious sending signals for help during an emergency event shown in the accompanying drawings, which are for illustrative purposes only. These drawings include the following figures, in which like numerals indicate like parts:

FIG. 1A is a schematic front view of a client device that provides a user interface including a panic control button for silently sending predefined emergency signals and sharing live A/V data of an emergency event with other devices, according to various aspects of the present embodiments;

FIG. 13 is a functional diagram illustrating an embodiment of a system that uses several A/V devices to capture and share the live A/V data during an emergency, according to various aspects of the present disclosure;

DETAILED DESCRIPTION

Figure 1B:
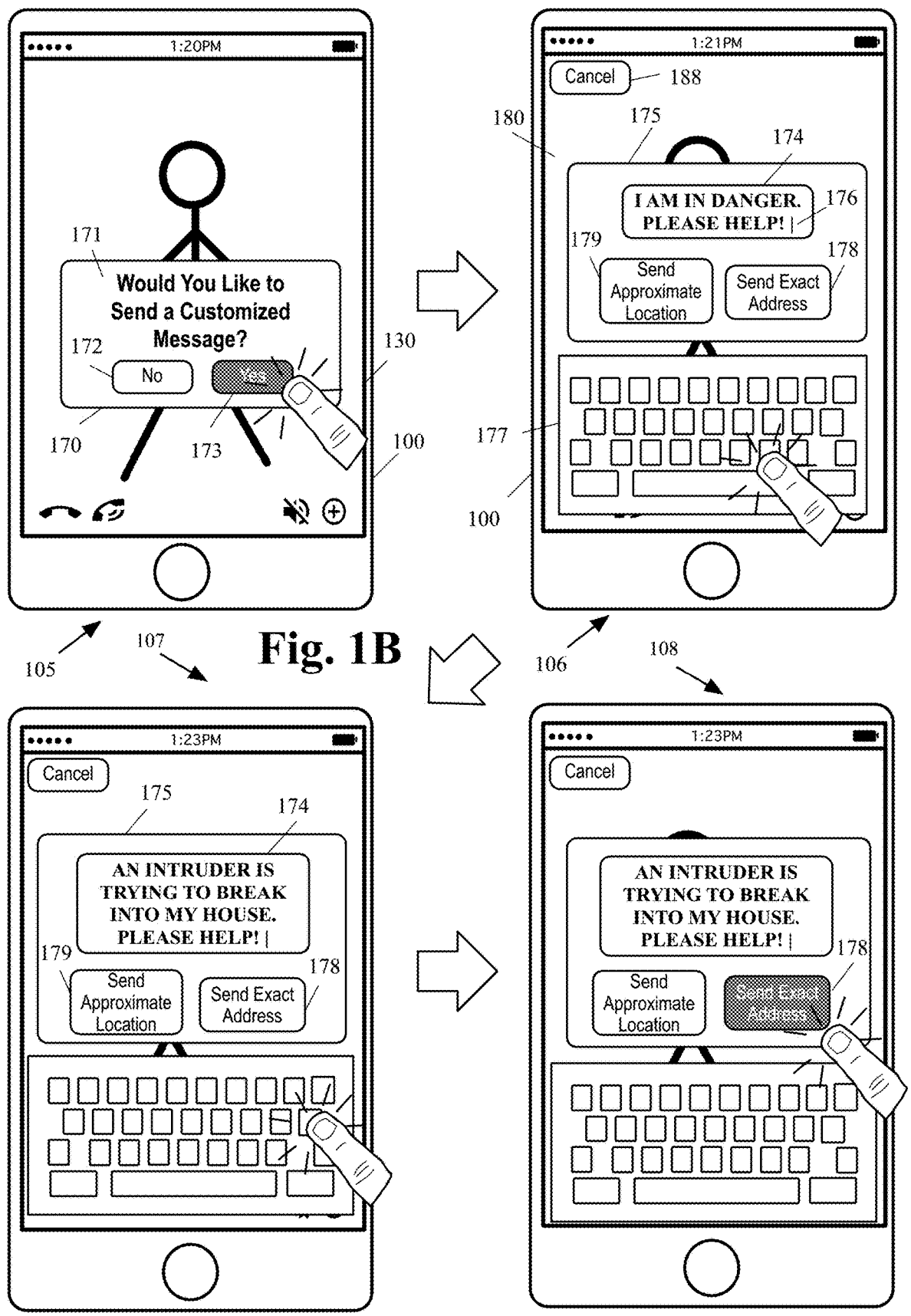
FIG. 1B is a schematic front view of a client device that provides a user interface for editing and sending customized emergency message(s) associated with the live A/V data of an emergency event, according to various aspects of the present embodiments.

One aspect of the present embodiments includes the realization that conventional client-device applications for A/V recording and communication devices (also referred to herein as "A/V devices") do not provide direct and discreet (e.g., silent) access to law enforcement agencies and/or neighbors during an emergency event. A conventional application for a client device associated with an A/V device may provide a user with video footage of a live event recorded by a camera of the A/V device. However, if the live video shows an emergency event (e.g., an imminent threat), the user may not be able to directly, and quietly, contact law enforcement (or the user's neighbors) to ask for help. To report an emergency event (e.g., a burglary in progress), the user may have to exit the client-device application that is playing the live video and dial an emergency number (e.g., 911 in North America). The process of exiting the application and dialing an emergency number can consume precious time in a situation where every second may be critical to avoiding serious harm. More importantly, in a perilous situation, such as when an intruder is entering (or is inside) the house, speaking over the phone, or making any type of noise, may draw the intruder's attention and put the user in even more serious danger.

The present embodiments, as described in detail below, solve this problem by providing a control button (e.g., a silent panic button) for quietly contacting emergency services (e.g., local police or other law enforcement), and/or neighbors, while a live video of an ongoing event is displayed on a client device. In some of the present embodiments, the control button may be presented in response to a touch gesture or other input on a display of the client device (e.g., pressing a finger on the screen for a predetermined time period, pressing and dragging a finger on the screen, tapping on the screen a predetermined number of times, etc.). In other aspects of the present embodiments, the control button may appear on the screen under other circumstances. For example, in one aspect of the present embodiments, the panic button may be displayed anytime live video footage is played. In another aspect of the present embodiments, the video footage may be analyzed first (e.g., through a computer vision process), and the panic button may be presented only if suspicious activity is detected in the video footage.

In some aspects of the present embodiments, the panic button may be displayed over the live video while the video is displayed on the display screen of the client device (e.g., partially covering a portion of the video). In some of the present embodiments, the panic button may appear under other circumstances. For example, in one aspect of the present embodiments, the panic button may appear on a prerecorded video (e.g., of a past event). As another example, the panic button may appear any time a particular input is received (e.g., a particular touch gesture) while the client-device application is executing.

In some of the present embodiments, when a user selects the panic button (e.g., by tapping on the button displayed on the screen), a new window that includes a predefined emergency message may be presented to the user. In some instances, the predefined emergency message may be modifiable by the user. Also, in some of the present embodiments, the emergency message may indicate that the user is in imminent danger of harm and needs immediate help. In one aspect of the present embodiments, the window may also include an option for including in the message a location (e.g., an address or an approximate address) of the property where the A/V device is located. The window may also provide a button for sending one or more emergency signals to other electronic devices.

In some of the present embodiments, a first emergency signal may be sent to one or more servers associated with emergency services (e.g., one or more law enforcement agencies). Also, in some of the present embodiments, a second emergency signal may be sent to a set of designated client devices. Examples of designated client devices may include, but are not limited to, a set of client devices assigned by the user (e.g., client devices belonging to family members, friends, specific neighbors, etc.), a predefined set of client devices (e.g., the client devices of all users that live within the same geographic area, or the same neighborhood where the A/V device is located, and are members of the same geographic network of users (e.g., an A/V data exchange group), etc.). In some of the present embodiments, when the live video footage is received from an A/V device that is installed at a property within a neighborhood, the second signal may be sent to at least one client device of every user that is associated with the same geographic network of users. In some aspects of the present embodiments, the neighborhood area may be predefined (e.g., based on boundaries of the neighborhoods in a city). In some of the present embodiments, the user may be able to modify the predefined neighborhood areas and/or boundaries.

In one aspect of the present embodiments, a first emergency signal may be sent to emergency services immediately after the panic button is selected, and a second emergency signal may be sent to other designated users after another window is opened for receiving additional user input. The additional user input, may include, but is not limited to, a description of the emergency event, a selection between the exact address or a general location for the property (e.g., to be sent to the neighbors), etc. In some other aspects of the present embodiments, the first and second emergency signals may be sent, respectively, to law enforcement agencies and the neighbors' client devices directly after the selection of the panic button. That is, in some embodiments, when the user selects the panic button, the emergency signals may be sent out without opening or activating any other window (e.g., for receiving the additional user input).

In some aspects of the present embodiments, in addition to the first and second signals that are sent, respectively, to emergency services and designated users, other signals may be sent to other devices. For example, in one aspect of the present embodiments, if the client device is associated with an alarm system (e.g., when an alarm/security system is installed at the property), a signal may be sent to a monitoring center that monitors the alarm/security system. In another aspect of the present embodiments, when the user selects the panic button, an activation signal may be sent to the other A/V devices that are associated with the property where the A/V device that has captured the emergency event is located. The activated A/V devices may start recording the surroundings of the property to record other potential perpetrators situated around the property, and/or record the same perpetrator moving to different locations around the property.

The emergency signals, in some of the present embodiments, may include, but are not limited to, (i) an emergency message (e.g., with or without user modification), (ii) an address associated with the property at which the A/V device that is providing the A/V data is installed (e.g., the exact address of the property, or an approximate location associated with the property), and (iii) a link (e.g., a Uniform Resource Locator (URL)) to the video (or at least a portion of the video), etc. In some of the present embodiments, the emergency signal that is sent to the set of designated users may include a specific type of notification (e.g., a push notification) to draw the designated users' attention, and to provide the emergency message and/or the link to the video footage when the designated users acknowledge the notification (e.g., by tapping on the notification window).

In some aspects of the present embodiments, no panic/ emergency signal may be sent to any other device, until and unless a moderating center confirms the emergency event. That is, in some aspects of the present embodiments, after a user selects the panic button (or the submission button on the second window that opens in response to the selection of the panic button), the video footage and the emergency message are first sent to one or more servers for a moderator to review. Only after confirmation of the emergency event by the moderator, the above described emergency signals may be sent to the other electronic devices (e.g., the law enforcement devices, the neighbors' client devices, the monitoring center devices, etc.). In one aspect of the present embodiments, the moderator may have the ability to modify the message (that may have or may have not been modified by the user) and/or the video footage.

The remaining detailed description describes the present embodiments with reference to the drawings. In the drawings, reference numbers label elements of the present embodiments. These reference numbers are reproduced below in connection with the discussion of the corresponding drawing features.

In some aspects of the present embodiments, a panic button may be displayed (e.g., on a display of a client device) in response to an input (e.g., a touch gesture on the display of the client device). FIG. 1A is a schematic front view of a client device that provides a user interface for receiving input (e.g., touch gestures) in order to present a control button (e.g., a panic button), and to silently send predefined emergency signals and share live A/V data of an emergency event with other devices, according to various aspects of the present embodiments. The figure illustrates, through four stages 101-104, a client device 100 receiving a notification 135 about a live (or ongoing) event generated by an A/V recording and communication device, opening an application that provides the notification 135 and displays the A/V data, displaying a panic button 190 for sending an emergency signal(s) in response to receiving a touch gesture, and transmitting the emergency signal(s) to other electronic devices once the panic button is selected.

With reference to FIG. 1A, stage 101 shows a graphical user interface (GUI) 120 displayed on a display (e.g., a touch screen) 130 of a client device 100, which may include several selectable user interface (UI) items (e.g., icons) of several applications 125. The client device 100 may receive a notification message 135 about a live event recorded by an A/V device associated with the client device 100.

The event notification 135 may include text identifying the type of the event (e.g., a detected-motion event, a doorbell button press event, etc.). The event notification in some aspects of the present embodiments is a push notification that may be displayed on the display 130 of the client device 100 even when the client device 100 is not executing an application for management and control of the A/V device(s) (e.g., when the client device 100 is hibernating, when the client device 100 is executing another application unrelated to the management and control of A/V device(s), etc.).

In some aspects of the present embodiments, the event notification 135 may be displayed on the display 130 of the client device 100 when the client device 100 is in a locked mode. In some aspects of the present embodiments, a device is in the locked mode when only a reduced set of controls can be used to provide input to the device. In some aspects of the present embodiments, when the display 130 of the client device 100 is turned off (e.g., to save battery power), the client device 100 may turn on the display 130 and display the event notification 135. In addition to, or in lieu of, displaying a banner, the client device may play an audio sound (such as one or more tones, one or more chimes, etc.) and/or the client device may vibrate one or more times to draw the attention of the user of the client device. In the example of FIG. 1A, the A/V device where the event is occurring is called "Front Door" (e.g., a video doorbell installed at the front door of a house), and the notification 135 indicates that a person is detected by the "Front Door" video doorbell. The person might have been detected by activating one or more motion sensors of the video doorbell, and/or by activating (e.g., pressing) a doorbell button of the video doorbell.

Stage 101 also shows that the user selects the notification 135 to open the application through which the notification is received (e.g., an application that is associated with the A/V device(s) of the user) and to view live video associated with the notification 135. Although the term video (or video clip) is used in several examples in this specification, the present embodiments are equally applicable to video clips with audio, video clips without audio, audio clips without video, and a group of one or more still images.

With continued reference to FIG. 1A, the application may be opened by tapping a finger on the notification 135 (e.g., through a touch contact with the client device's display at, or around, the location of the displayed notification 135) or through other techniques (e.g., using a pointing device if the client device is a laptop computer or a desktop computer).

Stage 102 of FIG. 1A shows that after opening the application, live video (e.g., received from an A/V device associated with the client device 100) is displayed in the display area 180 on the display 130 of the client device 100. The display area 180 may further include one or more UI items 150-153 that may establish or disconnect a communication channel between the user of the client device 100 and the person in the live video (e.g., through the client device 100 and the A/V device that is recording the live A/V data). When the first UI item 150 ("reject") is selected, in some of the present embodiments, any established communication (e.g., video) between the user of the client device and the person in the live video may be terminated, and the transmission of A/V data may be stopped. In some of the present embodiments, when the second UI item 151 ("accept") is selected, a two-way audio communication channel may be established between the user operating the client device 100 and the person in the live video. When the third UI item 152 ("mute") is selected, in some of the present embodiments, two-way audio communication between the user and the person in the live video may become one-way audio communication. When the fourth UI item 153 ("additional options") is selected, a set of new UI icons (e.g., for turning on the lights of the A/V device, turning on a siren of the A/V device, etc.) may appear on the display 130, in some of the present embodiments.

Stage 102 also shows that the user is performing a specific touch gesture on the display 130 of the client device 100 in order for a panic button to appear on the display 130. For example, as shown, the user's finger 185 touches an area of the display 130, while the video is playing, and the user drags the finger 185 across the display 130 (e.g., in an upward direction). Some embodiments may present the panic button in response to other types of touch gestures, and/or in response to other input types that are not touch gestures. For example, in one aspect of the present embodiments, the panic button may appear on the display 130 in response to the user pressing a finger on the display 130 and holding the finger on the display 130 for a predetermined time period (e.g., 3 seconds, 5 seconds, etc.). In another aspect of the present embodiments, the panic button may appear on the display 130 in response to the tapping of a finger on the display 130 a certain number of times (e.g., 2 times, 3 times, etc.).

With continued reference to FIG. 1A, stage 103 shows that in response to the specific touch gesture (e.g., the touch gesture shown in stage 102), a panic button 190 has appeared in the display area 180 over the displayed video. Some of the present embodiments may provide the panic button 190 to the user to quietly contact emergency services, and/or neighbors (e.g., pre-designated neighbors), when the user senses immediate danger and does not wish to make noise that might draw attention from an intruder.

Stage 103 also shows that the user may perform a touch gesture (or any other type of input) to send one or more emergency signals to the electronic devices of emergency services (e.g., law enforcement agencies, emergency responders, etc.) and/or neighbors. In some aspects of the present embodiments, the emergency signal(s) may be sent to the electronic devices of emergency services and to the client devices (e.g., the client devices) of the neighbors directly after the selection of the panic button 190. In these embodiments, in response to the selection of the panic button 190, the emergency signals may be sent out without opening or activating any other window (e.g., for receiving an emergency message from the user, as described below with reference to FIG. 1B).

As shown in stage 103, the user may press a finger 185 on the display 130 of the client device 100 in an area where the panic button 190 is displayed, and may hold the finger 185 on the display 130 for a specific time period (e.g., 3 seconds, 5 seconds, etc.). In some of the present embodiments, a simple selection of the panic button 190 (e.g., by tapping on the panic button 190), and without any particular touch gesture (e.g., holding the finger for a time period), may result in the transmission of the panic signal(s) to the other devices. Alternatively, the user may select an option such as the return button 191 to cancel the sending of the emergency signal(s) and/or the sharing of the live A/V data.

In some of the present embodiments, the emergency signal may be sent (e.g., to the designated devices of emergency services and/or neighbors) as a text message (also referred to as a short message or a short message service (SMS) message) that may include a predefined message and/or a link (e.g., a URL) for receiving live video of the emergency event. In other embodiments, the selection of the panic button 190 may send a message from the client device 100 to a networked server (e.g., as described below with reference to FIG. 9), and the networked server may send a message to the designated devices (e.g., as a text message or a message that is sent through one or more networks 912 of FIG. 9).

Stage 104 of FIG. 1A shows that in response to receiving the specific touch gesture (or other type of input) in stage 103, the emergency signal(s) are sent to the other designated devices and a confirmation window 195 appears on the display 130. The confirmation window 195 may confirm that the live video is being shared with, and one or more emergency signals have been sent to, the designated emergency services and/or neighbors. The confirmation window 195 may also display the message 160 that is sent to the designated devices. In other embodiments, the confirmation window 195 may just confirm that the emergency signal(s) has been sent. For example, the confirmation window 195, in some embodiments, may display a message such as: "The live video is being shared with, and an emergency signal has been sent to, the designated emergency services and neighbors."

In some aspects of the present embodiments, the panic button 190 may appear on the display 130 automatically and without any user intervention. For example, in some of the present embodiments, when the user selects a push notification that notifies the user of activity near an A/V device (e.g., the push notification 135 in stage 101 of FIG. 1A), the video footage associated with the push notification may first be analyzed (e.g., through a computer vision process) by one or more servers. The panic button 190 may then be presented on the display 130 (e.g., over the video footage) automatically when suspicious activity is detected in the analysis of the video footage. In some such embodiments, stage 102 of FIG. 1A may be skipped.

In some of the present embodiments, after the emergency signal(s) are sent to the designated emergency services and/or neighbors, the user may be provided with an option to send an additional customized emergency message to further describe the emergency event. In some of the present embodiments, the user may be provided with options to provide the exact address or an approximate location of the emergency event. FIG. 1B is a schematic front view of a client device that provides a user interface for editing and sending customized emergency message(s) associated with the live A/V data of an emergency event, according to various aspects of the present embodiments.

FIG. 1B, as shown, includes four stages 105-108. In stage 105, a message 171 is displayed in a display area 170 on the display 130 of the client device 100 to provide an option for generating and sending a customized message to the designated devices of emergency services and/or neighbors.

In some aspects of the present embodiments, the message 171 may be displayed after the panic button 190 (FIG. 1A) is selected and before the live A/V data is shared with the designated devices (e.g., as described in stage 104 of FIG. 1A). In other embodiments, the message 171 may be displayed after the live A/V data is shared with the designated devices (e.g., the message 171 may be displayed after stage 104 of FIG. 1A). In yet other aspects of the present embodiments, the message 171 may be displayed after the panic button 190 is selected and a link to the live video footage and an emergency signal have been sent to emergency services (but before any emergency signal has been sent to the neighbors' devices).

With further reference to FIG. 1B, the user may choose (e.g., by selecting option 172) to not generate and send a customized emergency signal. However, in the example of FIG. 1B, the user selects option 173 in stage 105 to generate a customized message. Thus, in stage 106, a default message (e.g., a message that is sent to the designated devices in stage 104 of FIG. 1A) may be displayed in the display area 174 in order for the user to edit the default message and generate a customized message. In other embodiments, the area 174 may initially be blank and include no message. In stage 106, an indicator (e.g., a cursor point) 176 may identify the point that may be affected by an input from the user. If the display 130 of the client device 100 is a touchscreen, a representation 177 of a keyboard may be displayed on the display 130 of the client device 100 for receiving the user input. Also, in stage 106, an option 188 may be provided for canceling the editing and sending of the emergency message.

With further reference to FIG. 1B, stage 107 shows that the user has generated a new message in the display area 174 (e.g., by using the keyboard 177). The display area 175 may further provide an option 178 for including the exact address of a location where the A/V device that is capturing the live A/V data is located. The display area 175 may also provide an option 179 for including an approximate location of where the A/V device that is capturing the live A/V data is located (e.g., a nearby intersection, a city block, etc.).

As shown in stage 108, the user may select the option 178 to send the exact address. After one of the options 178 or 179 is selected, the customized message in the display area 174 may be sent to the designated devices (e.g., as a text message from the client device 100 or as a message from a networked server as described below with reference to FIG. 9). In some of the present embodiments, in addition to, or in lieu of, the options 178 and 179, an option (e.g., a submit button (not shown)) may be provided for sending the customized message to the designated devices.

Figure 1C:
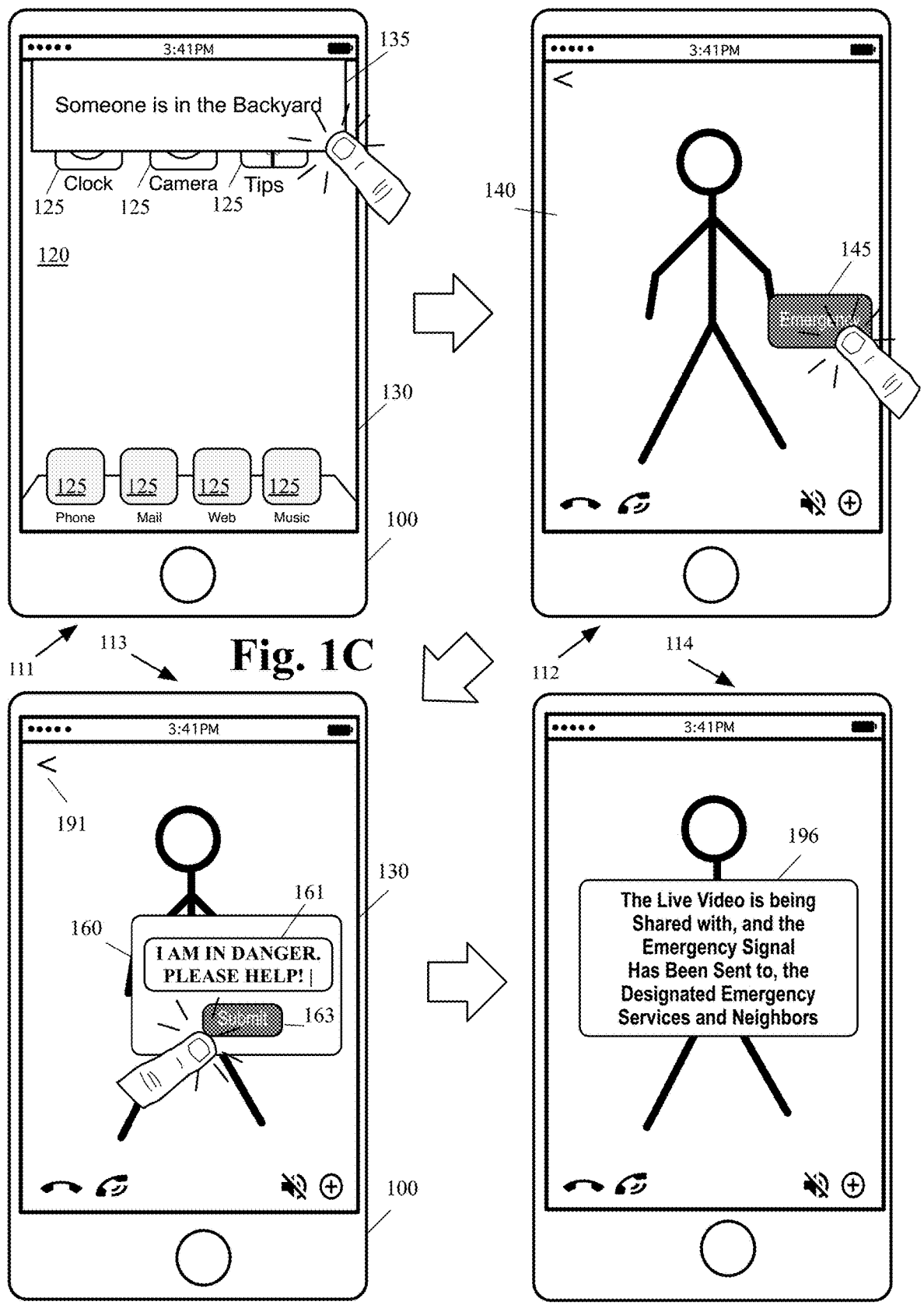
FIG. 1C is a schematic front view of a client device that provides a user interface for sending emergency message(s) and sharing live A/V data associated with an emergency event with emergency services and neighbors, according to various aspects of the present embodiments.

FIG. 1C is a schematic front view of a client device that provides a user interface for sending emergency message(s) and sharing live A/V data associated with an emergency event with emergency services and neighbors, according to various aspects of the present embodiments. FIG. 1C illustrates an aspect of the present embodiments in which a window 160 may open after the panic button is selected. The window 160 may be used for receiving additional user input (e.g., as described above with reference to the window 170 of FIG. 1B), as well as confirming the submission of the emergency signals. FIG. 1C illustrates, through four stages 111-114, a client device 100 receiving a notification 135 about a live (or ongoing) event generated by an A/V recording and communication device, opening an application that provides the notification 135 and displays the A/V data, submitting one or more emergency signal(s) to other devices once a panic button is selected, and receiving a confirmation after the emergency signal(s) is/are submitted. In the example of FIG. 1C, the A/V device where the event is occurring is called "Backyard" (e.g., a security camera or a light camera as described below with reference to FIG. 2), and the notification 135 indicates that a person is detected by the "Backyard" A/V device. The person might have been detected by activating one or more motion sensors of the A/V device.

Stage 111 is similar to stage 101 of FIG. 1A. After the selection of the notification 135, the application through which the notification is received is opened in stage 112, and the display area 140 displays live video transmitted to the client device 100 from an A/V device. Stage 112 is similar to stage 103 of FIG. 1A, and includes a panic button 145 that partially overlays the video shown in the display area 140. In some aspects of the present embodiments, the panic button 145 may be displayed (e.g., over live video) each time a live video is displayed on the display 130. The live video, in the second stage 112, may show that a suspicious person is standing in the field of view of the camera. Some of the present embodiments may provide the panic button 145 to the user to quietly contact emergency services, and/or neighbors (and to share the video with emergency services and neighbors), when the user senses immediate danger and does not wish to make noise to draw attention. In stage 112, the panic button 145 is selected.

With further reference to FIG. 1C, stage 113 shows that after selection of the panic button 145 a predefined emergency message 161 may be displayed in a display area 160 on the display 130 of the client device 100. In some of the present embodiments, the emergency message 161 may indicate the user is in imminent danger of harm and needs immediate help. The display area 160 may also provide a submit button 163 for submission (e.g., transmission) of the text message.

In some aspects of the present embodiments, a predefined emergency message, such as the emergency message 161, may be displayed, and the user may have the option to modify (e.g., edit) the displayed text (e.g., delete the message, add to the message, or change the message). For example, the user may select the message 161 (e.g., by tapping on the message 161 if the display 130 of the client device 100 is a touchscreen, or by selecting the message 161 with a pointing device such as a mouse) in order to edit the message 161. The user may then edit the message as described above with reference to stages 106-107 of FIG. 1B. In other embodiments, the message 161 may not be editable.

After the display (and potential modification) of the emergency message 161, the user may select the submit button 163 to confirm the emergency event and to share the emergency message 161 and at least a portion of the video shown on the display area 140 with other devices (e.g., emergency services' devices, neighbors' devices, etc.). The user may also cancel the sending of the emergency message and the sharing of the live A/V data by selecting an option such as the return button 191.

Stage 114 of FIG. 1C shows that in response to the selection of the submit button 163 in stage 113, the emergency signal(s) have been sent to, and the live A/V data has been shared with, the other designated devices, and a confirmation window 196 has appeared on the display 130. The confirmation window 196 may confirm that the live video is being shared with, and an emergency signal has been sent to, the designated emergency services and/or neighbors.

Although not shown in FIG. 1C, the display area 160 in stage 113 may include other items in some aspects of the present embodiments. For example, in one aspect of the present embodiments, the display area 160 may include an option for choosing (e.g., through a checkbox item, a radio button, etc.) between sharing an address related to the property with the neighbor devices or not. In some of the present embodiments, the user may have a choice (e.g., via a selection item such as item 178 of FIG. 1B, a checkbox item, a radio button, etc.) to select the related address to be the exact address of the property. The user may also have a choice (e.g., via a selection item such as item 179 of FIG. 1B, a checkbox item, a radio button, etc.) to select the related address to be an approximate address (e.g., a general address associated with the user's property such as the nearest intersection, a city block identifier, etc.).

Figure 2:
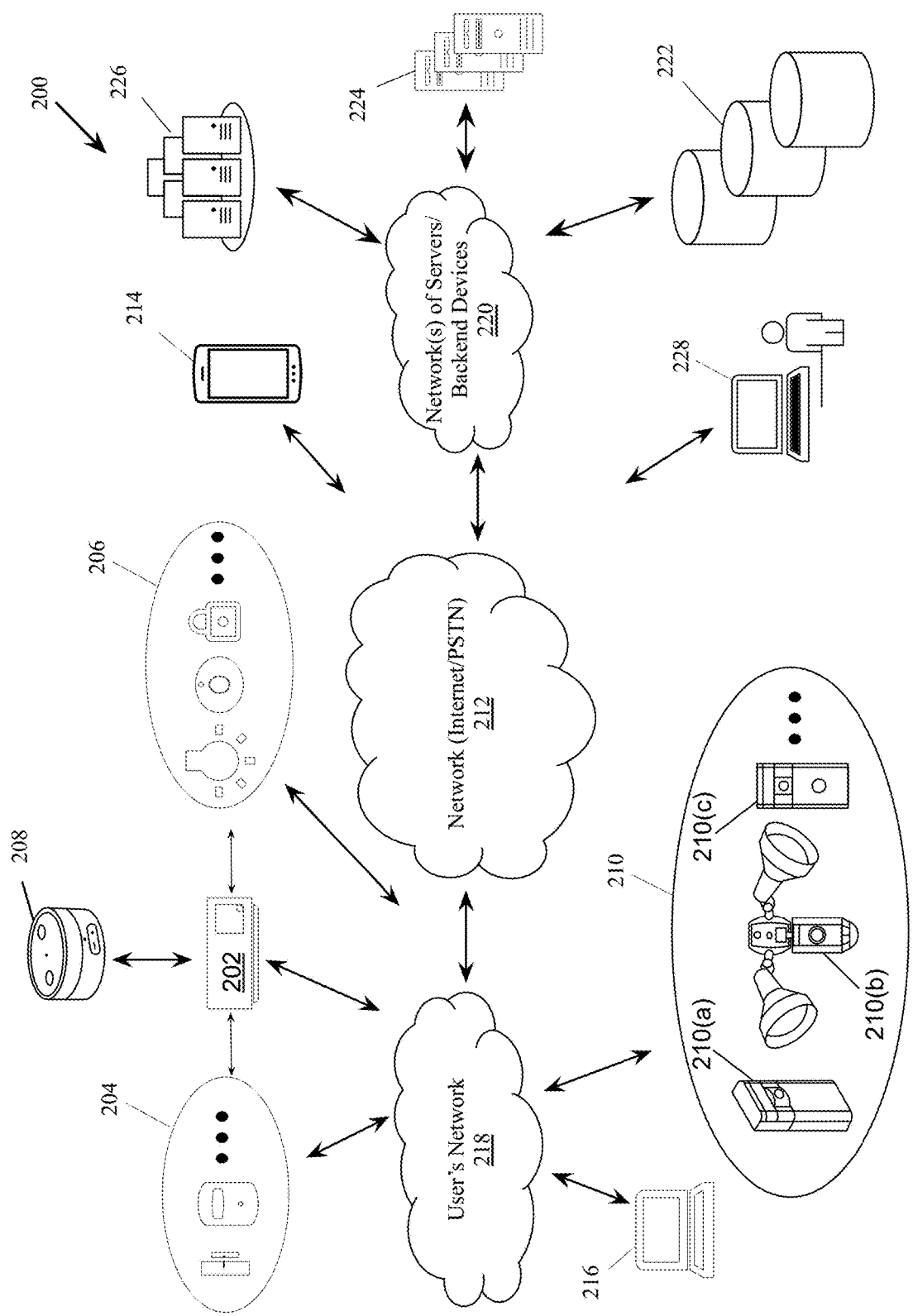
FIG. 2 is a functional block diagram illustrating a system for communicating in a network, according to various aspects of the present disclosure.

FIG. 2 is a functional block diagram illustrating a system 200 for communicating in a network, according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various embodiments, Wi-Fi is used for remote monitoring and control of such devices and/or systems. Smart home devices (e.g., hub devices 202, sensors 204, automation devices 206, a virtual assistant (VA) device 208, audio/video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

Figure 9:
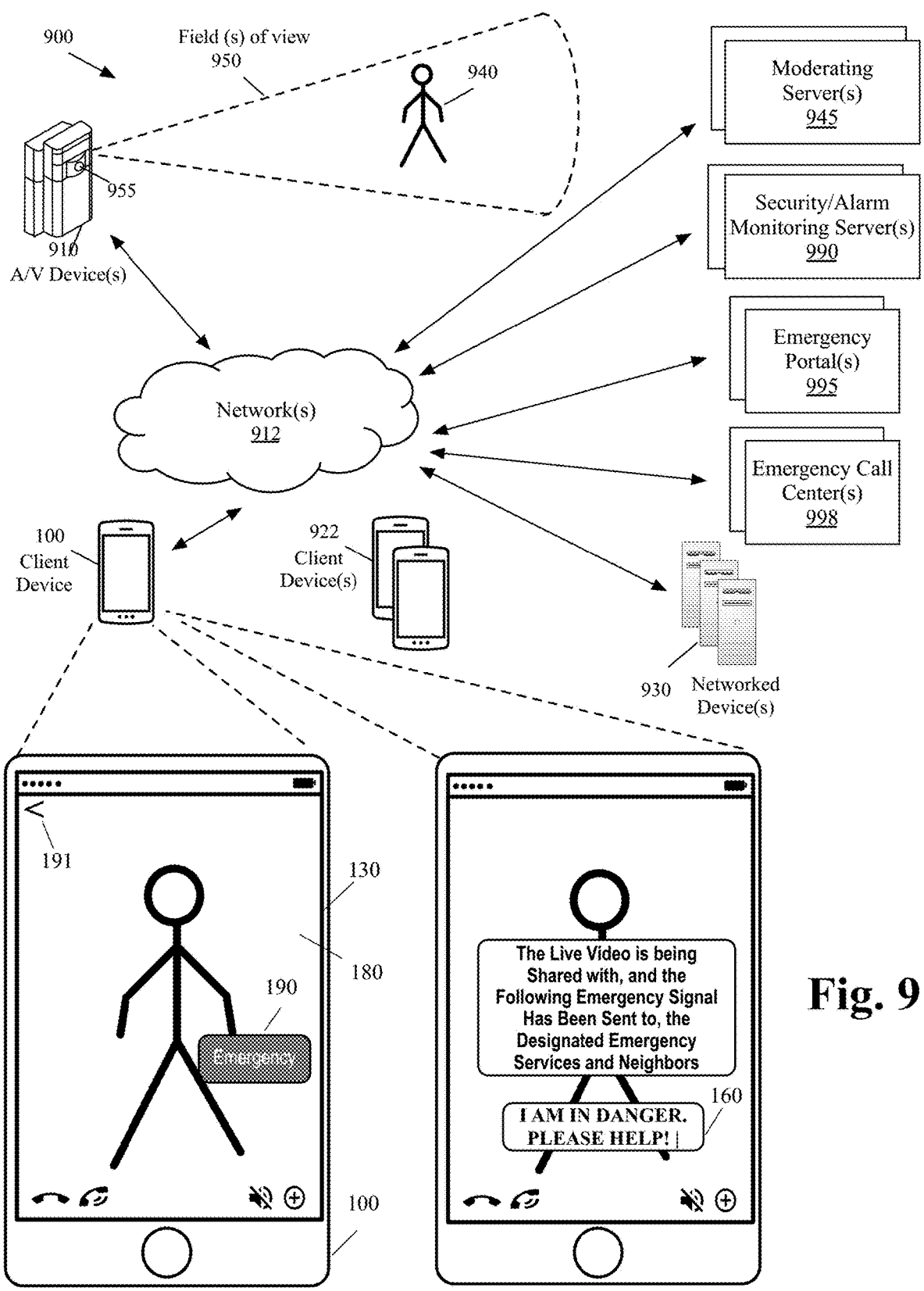
FIG. 9 is a functional diagram illustrating an embodiment of a system for sending emergency signals and sharing live A/V data captured by one or more A/V devices, according to various aspects of the present disclosure.

The system 200 may include one or more A/V recording and communication devices 210 (alternatively be referred to herein as "A/V devices 210" or "A/V device 210") (which may represent, and/or be similar to, the A/V devices 910 of FIG. 9). The A/V devices 210 may include security cameras 210(*a*), light cameras 210(*b*) (e.g., floodlight cameras, spotlight cameras, etc.), video doorbells 210(*c*) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some embodiments, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present embodiments, the A/V devices 210, the VA device 208, the sensors 204, and/or the automation devices 206 may, in addition to, or in lieu of, communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some embodiments, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various embodiments, the VA device 208 may include an array of speakers that are able to produce beams of sound. Although illustrated as a separate component in FIG. 2, in some embodiments the VA device 208 may not be a separate component from the hub device 202. In such embodiments, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various embodiments, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.) a doorbell chime, a barrier control device (e.g., an automated door hinge), a smart doormat, and/or other automation devices.

As described herein, in some of the present embodiments, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216 (which may represent, and/or be similar to, the client device(s) 100 of FIGS. 1A-1C). The client devices 214, 216 may communicate with and/or be associated with (e.g., capable of access to and control of) the A/V devices 210, a smart-home hub device 202, the VA device 208, sensors 204, and/or automation devices 206. In various embodiments, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some embodiments, the client devices 214, 216 includes a connected device, such as a smart watch, Bluetooth headphones, another wearable device, or the like. In such embodiments, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In an embodiment, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various embodiments, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some embodiments, the backend API 226 maintains user data and provides user management capabilities, thereby reducing the load (e.g., memory and processor consumption) of the client devices 214, 216.

In various embodiments, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet/PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices." The network device(s) 930 of FIG. 9 may include one or more of the network devices described herein.

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In other embodiments, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present embodiments, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some embodiments, via one or more of the components of the network of backend servers/backend devices 220).

Figure 3:
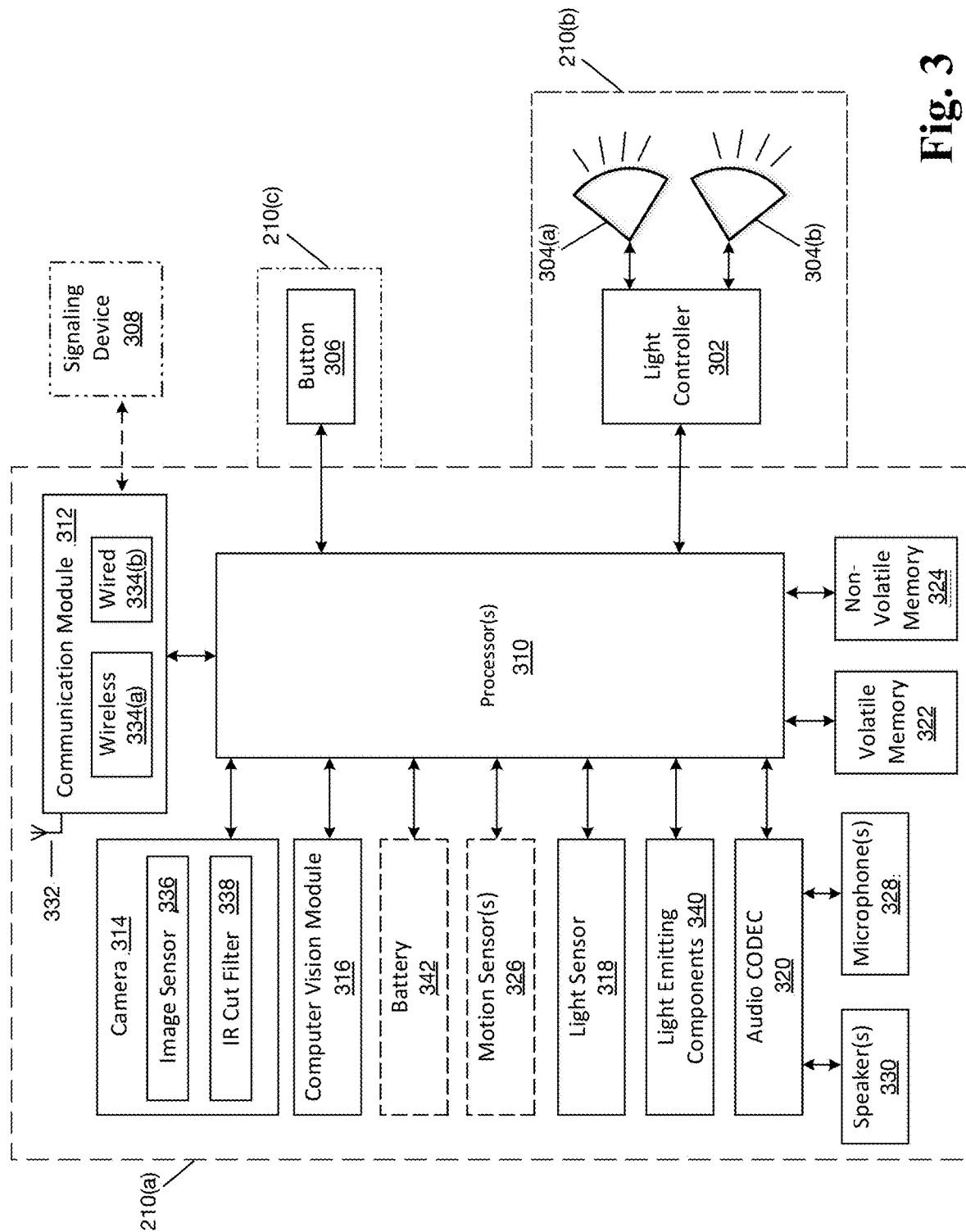
FIG. 3 is a functional block diagram of an A/V recording and communication device, according to various aspects of the present disclosure.

FIG. 3 is a functional block diagram for an audio/video (A/V) device, according to various aspects of the present disclosure. In some embodiments, the one or more A/V devices 210 may include the security camera 210(a). In other embodiments, the one or more A/V devices 210 may include the light camera 210(b), which may include some or all of the components of the security camera 210(a) in addition to a light controller 302 and one or more lights 304(a), 304(b). In some embodiments, the one or more A/V devices 210 may include the video doorbell 210(c), which may include some or all of the components of the security camera 210(a) in addition to a button 306, and in some embodiments, a connection to a signaling device 308 (e.g., a pre-installed signaling device, such as a wired signaling device, and/or a wireless signaling device, connected over Wi-Fi, BLE, or another wireless communication protocol).

With further reference to FIG. 3, the A/V device 210 may include a processor(s) 310, a communication module 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the communication module 312, and may perform various functions as described in the present disclosure. In various embodiments, when the processor(s) 310 is triggered by the motion sensor(s) 326, the camera 314, the speaker(s) 330, the microphone(s) 328, the communication module 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the communication module 312 and the camera 314.

With further reference to FIG. 3, the communication module 312 may comprise an integrated circuit including a processor core, memory, and programmable input/output peripherals. The communication module 312 may be operatively connected to the processor(s) 310. In some embodiments, the communication module 312 is configured to handle communication links between the A/V device 210 and other, external devices, external receivers, external transmitters, and/or external transceivers, and to route incoming/outgoing data appropriately. For example, inbound data from an antenna 332 of the communication module 312 may be routed through the communication module 312 before being directed to the processor(s) 310, and outbound data from the processor(s) 310 may be routed through the communication module 312 before being directed to the antenna 332 of the communication module 312. As another example, the communication module 312 may be configured to transmit data to and/or receive data from a remote network device (e.g., one or more components of the network(s) of servers/backend devices 220 described in FIG. 2). The communication module 312 may include wireless 334(*a*) and wired 334(*b*) adapters. For example, the communication module 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The communication module 312 may receive inputs, such as power and/or data, from the camera 314, the processor(s) 310, the button 306 (in embodiments where the A/V device 210 is the video doorbell 210(*c*)), the motion sensors 326, a reset button (not shown in FIG. 3 for simplicity), and/or the non-volatile memory 324. The communication module 312 may also include the capability of communicating over wired connections, such as with a signaling device 308. For example, when the button 306 of the video doorbell 210(*c*) is pressed, the communication module 312 may be triggered to perform one or more functions, such as to transmit a signal over the wired 334(*b*) connection to the signaling device 308 (although, in some embodiments, the signal be transmitted over a wireless 334(*a*) connection to the signaling device) to cause the signaling device 308 to emit a sound (e.g., a doorbell tone, a user customized sound, a ringtone, a seasonal ringtone, etc.). The communication module 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain embodiments the non-volatile memory 324 may comprise serial peripheral interface (SPI) flash memory. In some embodiments, the non-volatile memory 324 may comprise, for example, NAND or NOR flash memory. The volatile memory 322 may comprise, for example, DDR3 SDRAM (double data rate type three synchronous dynamic random-access memory). In the embodiment illustrated in FIG. 3, the volatile memory 322 and the non-volatile memory 324 are illustrated as being separate from the processor(s) 310. However, the illustration of FIG. 3 is not intended to be limiting, and in some embodiments the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some embodiments, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the communication module 312 to the network (Internet/PSTN) 212. In various embodiments, the camera 314 also includes memory, such as volatile memory that may be used when data is being buffered or encoded by the processor(s) 310 (and/or the camera processor). For example, in certain embodiments the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 229 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some embodiments, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some embodiments, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the communication module 312 (in some embodiments, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the communication module 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the communication module 312, the digital audio data from the user is decompressed by the audio CODEC 320 and emitted to the visitor through the speaker(s) 330.

With further reference to FIG. 3, the A/V device 210 may be battery powered using a battery 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various embodiments, the output of the AC/DC adapter is in a range from about 9 V to about 15 V and in a range from about 0.5 A to about 5 A. These voltages and currents are examples provided for illustration and are not intended to be limiting.

However, in other embodiments, a battery 342 may not be included. In embodiments that include the battery 342, the A/V device 210 may include an integrated circuit (not shown) capable of arbitrating between multiple voltage rails, thereby selecting the source of power for the A/V device 210. The A/V device 210 may have separate power rails dedicated to the battery 342 and the AC power source. In one aspect of the present disclosure, the A/V device 210 may continuously draw power from the battery 342 to power the A/V device 210, while at the same time routing the AC power to the battery, thereby allowing the battery 342 to maintain a substantially constant level of charge. Alternatively, the A/V device 210 may continuously draw power from the AC power to power the doorbell, while only drawing from the battery 342 when the AC power is low or insufficient. Still, in some embodiments, the battery 342 comprises the sole source of power for the A/V device 210. In such embodiments, the components of the A/V device 210 (e.g., spring contacts, connectors, etc.) are not be connected to a source of AC power. When the battery 342 is depleted of its charge, it may be recharged, such as by connecting a power source to the battery 342 (e.g., using a USB connector).

Although not illustrated in FIG. 3, in some embodiments, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some embodiments, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some embodiments, the motion sensor(s) 326 may comprise passive infrared (PIR) sensors, which may be secured on or within a PIR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the embodiment, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some embodiments, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the battery 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various embodiments, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present embodiments, with reference to FIG. 3, the microphone(s) 328, the camera 314, the processor(s) 310, and/or the image sensor 336 may be components of the CVM 316. In some embodiments, the CVM 316 may include an internal camera, image sensor, and/or processor, and the CVM 316 may output data to the processor(s) 310 in an output signal, for example.

As a result of including the CVM 316, some of the present embodiments may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present embodiments may use facial recognition hardware and/or software, as a part of the computer vision system. Various types of facial recognition exist, some or all of which may be used in the present embodiments.

Some face recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present embodiments to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present embodiments may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in embodiments where the A/V device 210 includes a light camera, the A/V device 210 may include the light controller 302 and one or more lights 304(a), 304(b) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(a), 304(b). In some embodiments, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other embodiments, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in embodiments where the A/V device 210 includes a doorbell, such as the video doorbell 210(c), the A/V device 210 may include the button 306. In embodiments where the button 306 is a mechanical button (e.g., has a range of movement), the button 306 may make contact with a button actuator located within the video doorbell 210(c) when the button 306 is pressed. In embodiments where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the communication module 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the communication module 312, to the client device(s) 214, 216 to indicate to the user(s) of the client device(s) 214, 216 that a person is present at the A/V device 210 (in some embodiments, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some embodiments, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
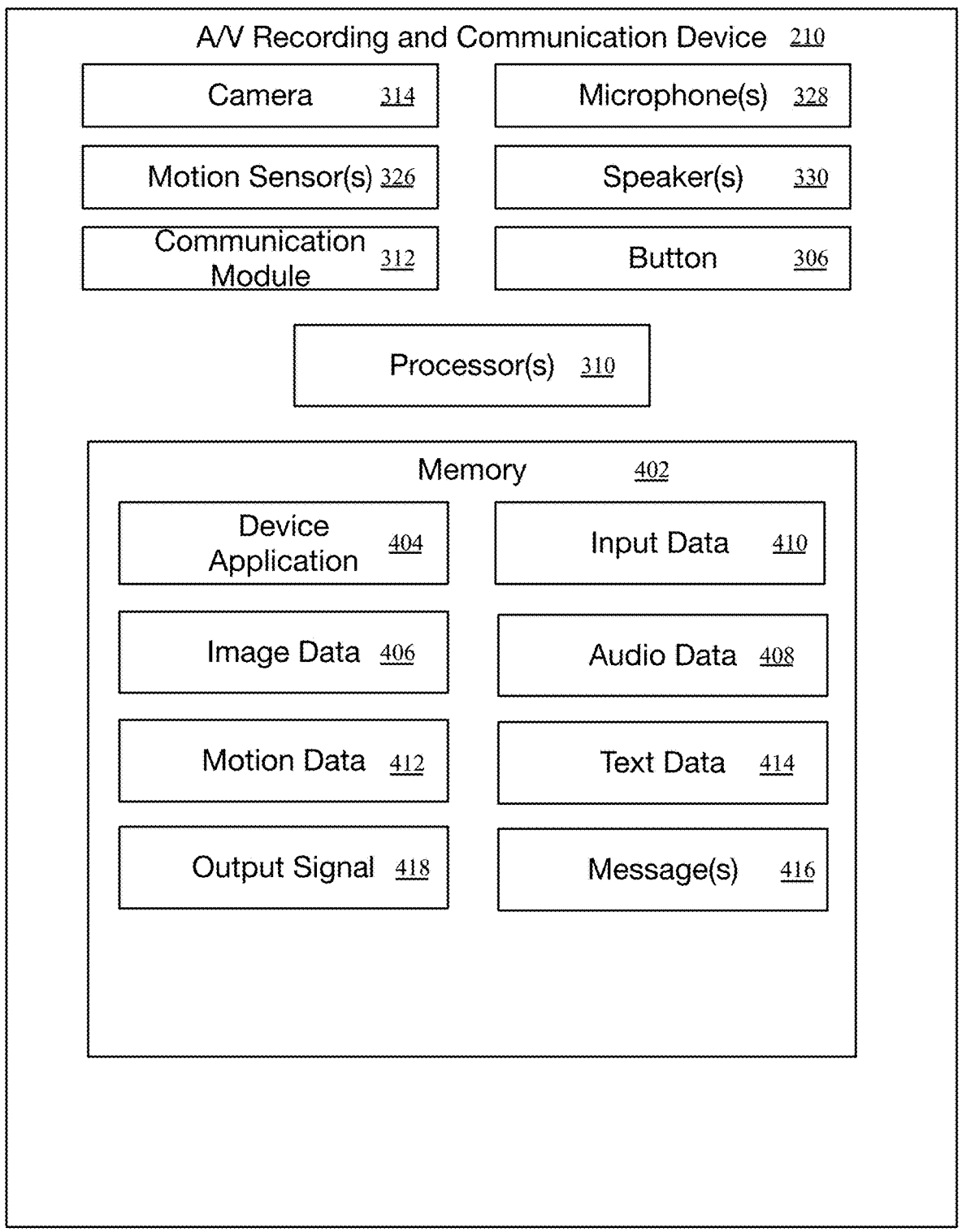
FIG. 4 is a functional block diagram illustrating one example embodiment of an A/V recording and communication device, according to various aspects of the present disclosure.

FIG. 4 is another functional block diagram illustrating an embodiment of the A/V device 210, according to various aspects of the present disclosure. In some embodiments, the A/V device 210 may represent, and further include one or more of the components from, the A/V recording and communication doorbell 210(c), the A/V recording and communication security camera 210(a), and/or the floodlight controller 210(b). Additionally, in some embodiments, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various embodiments, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the embodiment), and/or motion data 412 using the camera 314 and/or the motion sensor(s) 326. In some embodiments, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the communication module 312. In various embodiments, the device application 404 may also configure the processor(s) 310 to generate and transmit an output signal 418 that may include the image data 406, the audio data 408, the text data 414, the input data 410, and/or the motion data 412. In some of the present embodiments, the output signal 418 may be transmitted to the backend server 224 and/or the hub device 202 using the communication module 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other embodiments, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present embodiments, such as those where the A/V device 210 does not include the motion sensor(s) 326, the motion data 412 may be generated by the camera 314. In such embodiments, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input. In embodiments where the A/V device 210 is not a doorbell (e.g., the video doorbell 210(c)), the A/V device 210 may not include the button 306, and the A/V device 210 may not generate the input data 410.

With further reference to FIG. 4, a message 416 may be generated by the processor(s) 310 and transmitted, using the communication module 312, to the client device 214, 216, the backend server 224, and/or the hub device 202. For example, in response to detecting motion using the camera 314 and/or the motion sensor(s) 326, the A/V device 210 may generate and transmit the message 416. In some of the present embodiments, the message 416 may include at least the image data 406, the audio data 408, the text data 414, and/or the motion data 412.

As described herein, the message(s) 416 may include messages, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210.

Figure 5:
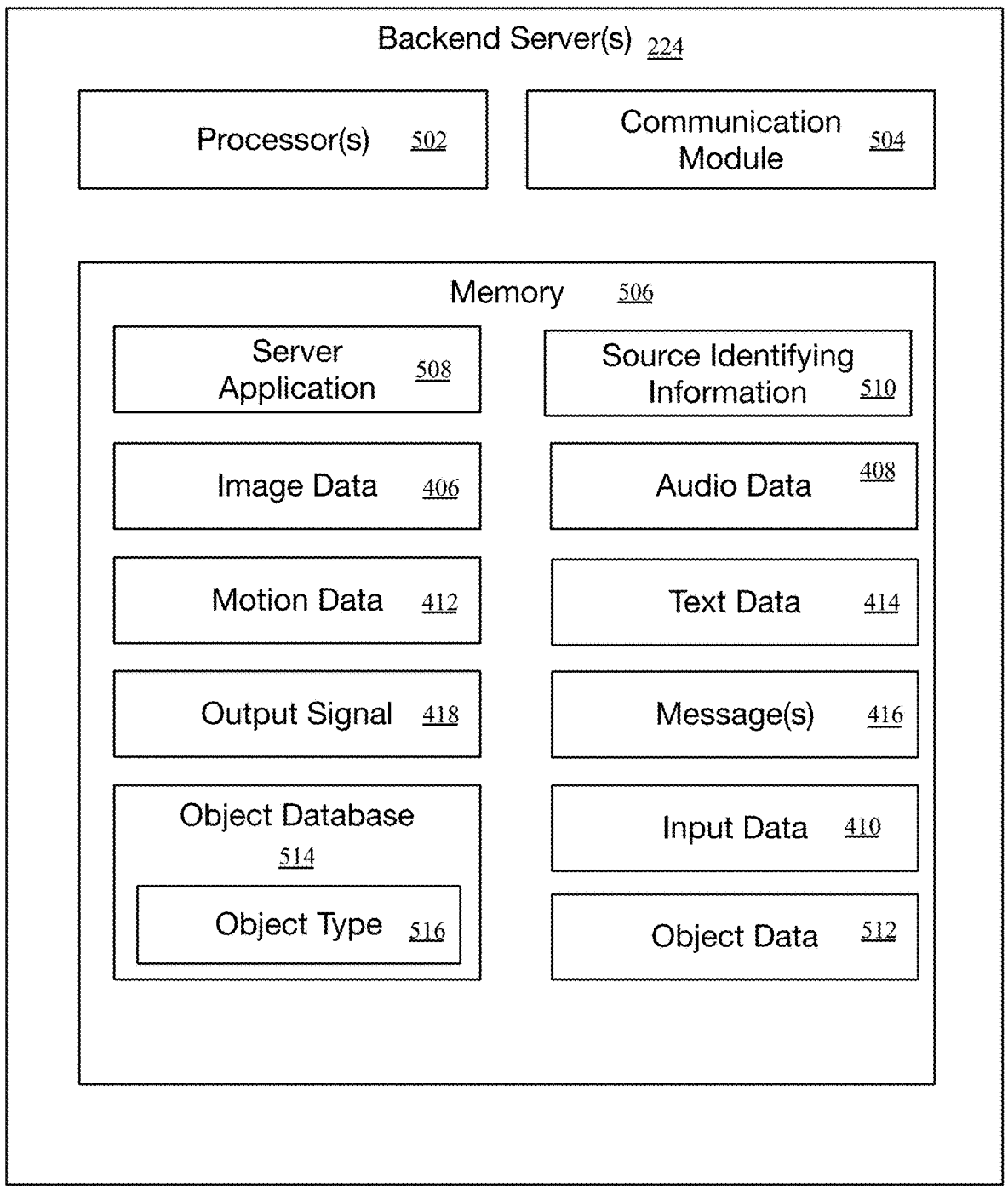
FIG. 5 is a functional block diagram illustrating one example embodiment of a backend device, according to various aspects of the present disclosure.

FIG. 5 is a functional block diagram illustrating one embodiment of the backend server 224, according to various aspects of the present disclosure. The backend server 224 may comprise processor(s) 502 (which may be similar to, and/or include similar functionality as, the processor(s) 310), a communication module 504 (which may be similar to, and/or include similar functionality as, the communication module 312), and a memory 506 (which may be similar to, and/or include similar functionality as, the memory 402). The communication module 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 402 may include a server application 508 that configures the processor(s) 502 to receive and/or retrieve the audio data 408, the text data 414, the input data 410, the messages 416, the image data 406, and/or the motion data 412 from the A/V device 210 (e.g., in the output signal 418) and/or the hub device 202. The server application 508 may also configure the processor(s) 502 to transmit (and/or forward) the audio data 408, the text data 414, the input data 410, the messages 416, the image data 406, and/or the motion data 412 to the client devices 214, 216 using the communication module 504. Furthermore, the server application 508 may configure the processor(s) 502 to receive, using the communication module 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some embodiments, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224.

For example, the server application 508 may configure the processor(s) 502 to analyze the image data 406 in order to determine if the image data 406 depicts an object. Objects may include, but are not limited to, people, animals, vehicles, parcels (e.g., packages), electronic devices (e.g., remote control vehicles, drones, etc.), and/or any other type of object that can be depicted by the image data 406 and/or cause motion that can be detected by the A/V device 210. In some examples, the processor(s) 502 of the backend server 224 may analyze the image data 406 whenever the backend server 224 receives the image data 406 from the A/V device 210.

In some examples, to analyze the image data 406, computer vision processing and/or image processing, as described herein, for example, may be performed by the processor(s) 502 of the backend server 224 to determine that the image data 406 depicts one or more objects. For example, in any of the present embodiments, the image data 406 generated by the A/V device 210 may be analyzed to determine object data 512. In some of the present embodiments, one or more of the image data 406, the motion data 412, and the audio data 408 may be used to determine the object data 512. The computer vision and/or image processing may be executed using computer vision and/or image processing algorithms. Examples of computer vision and/or image processing algorithms may include, without limitation, spatial gesture models that are 3D model-based and/or appearance based. 3D model-based algorithms may include skeletal and volumetric, where volumetric may include NURBS, primitives, and/or super-quadrics, for example.

In some embodiments, the processor(s) 502 of the backend server 224 may compare the object data 512 to an object database 514 to determine what, if any, object(s) the image data 406 depicts in the field of view of the A/V device 210. For example, the object database 514 may store image data corresponding to images and/or video footage that depict various objects, where the image data may be labeled (e.g., tagged, such as in the form of metadata) to indicate an object type 516 (alternatively referred to herein as the "type of object 516") depicted by each image and/or video footage. For a first example, the object database 514 may store image data depicting a person, where the image data is labeled to indicate that the type of object 516 includes a person. For a second example, the object database 514 may store image data depicting an animal (e.g., a dog, a cat, a coyote, etc.), where the image data is labeled to indicate that the type of object 516 includes the animal (e.g., the dog, the cat, the coyote, etc.). For a third example, the object database 514 may store image data depicting a vehicle, where the image data is labeled to indicate the type of object 516 includes the vehicle.

Based on the comparing, the processor(s) 502 of the backend server 224 may match the object data 512 from the image data 406 to the image data stored in the object database 514. The processor(s) 502 of the backend server 224 may then use the match to determine that the object data 512 represents an object and/or to determine the type of object 516 that the object data 512 represents. For example, if the processor(s) 502 of the backend server 224 matches the object data 512 from the image data 406 to image data stored in the object database 514 that represents a person, then the processor(s) 502 of the backend server 224 may determine that the image data 406 depicts an object and/or that the image data 406 depicts a person. In some examples, when the object data 512 represents multiple objects, the processor(s) 502 of the backend server 224 may perform a similar analysis to identify each object represented by the object data 512 and/or the respective type of object 516 associated with each of the objects represented by the object data 512.

In some examples, in addition to, or alternatively from, comparing the image data 406 to the image data stored in the object database 514, features and/or characteristics of various objects may be stored in the object database 514, and the features and/or characteristics of the objects in the image data 406 may be determined (e.g., using computer vision processing, image processing, or the like) and compared against the features and/or characteristics from the object database 514. For example, sizes, volumes, weights, colors, movement types, and/or other features and/or characteristics of various objects may be stored in the object database 514. The size, volume, weight, color, movement type, and/or other features and/or characteristics of an object depicted by the image data 406 may then be compared to the sizes, volumes, weights, colors, movement types, and/or other features and/or characteristics stored in the object database 514 to identify the type of object 516 depicted by the image data 406.

Although described as being performed in the backend server 224, in some embodiments, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the object data 514, as described with reference to FIG. 5.

The hub device 202 and/or the backend server 224 (and/or one or more additional or alternative components of the network(s) of servers/backend devices 220) may alternatively be referred to herein as "network devices."

Figure 6:
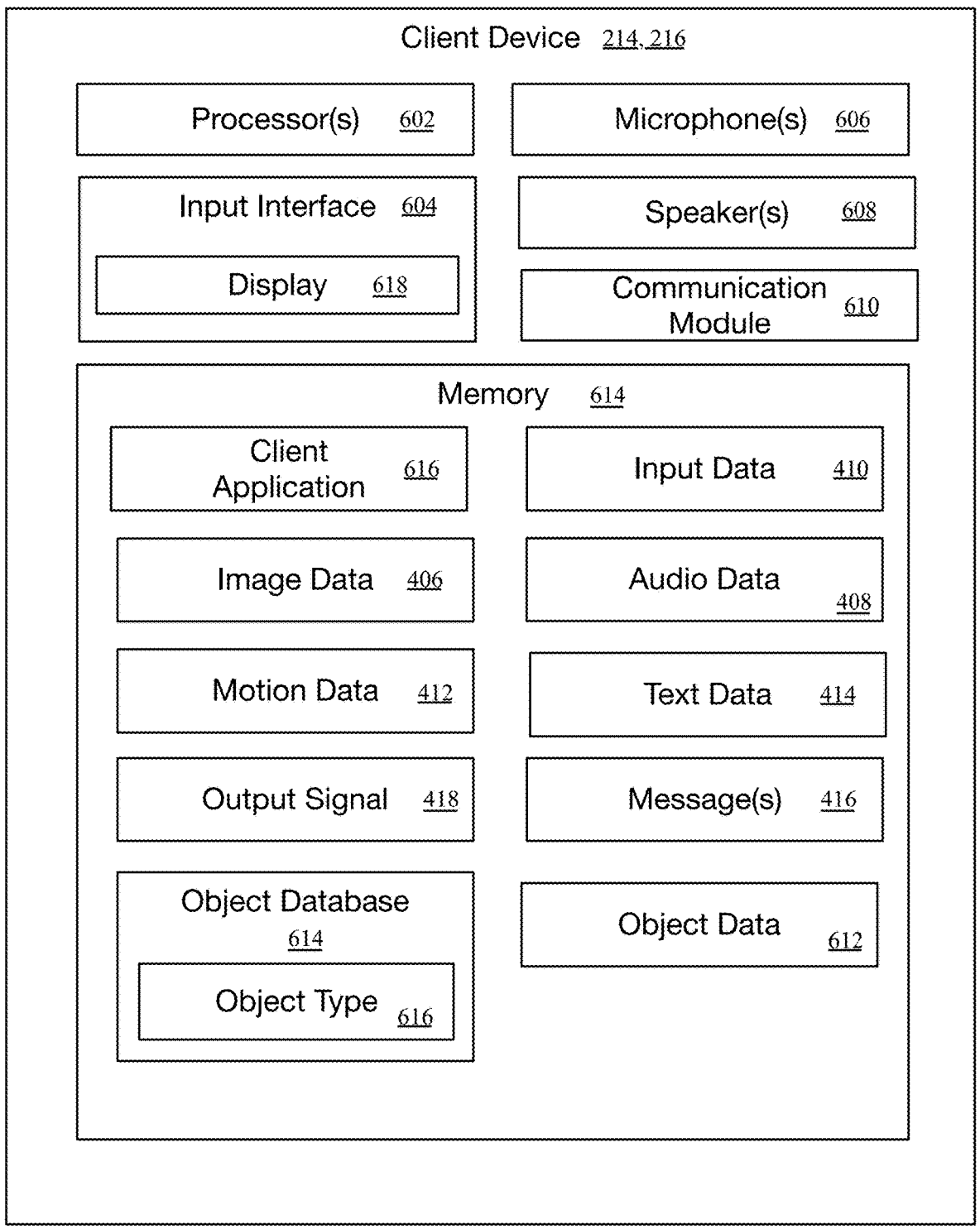
FIG. 6 is a functional block diagram illustrating one example embodiment of a client device, according to various aspects of the present disclosure.

Now referring to FIG. 6, FIG. 6 is a functional block diagram illustrating one embodiment of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a communication module 610 (which may be similar to, and/or include similar functionality as, the communication module 312), and memory 612 (which may be similar to, and/or include similar functionality as, the memory 402). The client device 214, 216 may further comprise a camera (not shown) operatively connected to the processor(s) 602.

The memory 612 may store a device application 614. In various embodiments, the device application 614 may configure the processor(s) 602 to receive input(s) to the input interface 604 (e.g., the display 130 of the client device 100 in FIG. 1A). In addition, the device application 614 may configure the processor(s) 602 to receive, using the communication module 610, the input data 410, the image data 406, the audio data 408, the output signal 418, and/or messages 416 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., as shown in stages 105-108 of FIG. 1B). In some embodiments, the client device 214, 216 may not include a touchscreen. In such embodiments, and in embodiments where the client device 214, 216 includes the touchscreen, the user may provide an input using any input device, such as, without limitation, a mouse, a trackball, a touchpad, a joystick, a pointing stick, a stylus, etc.

In some of the present embodiments, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216.

Figure 7:
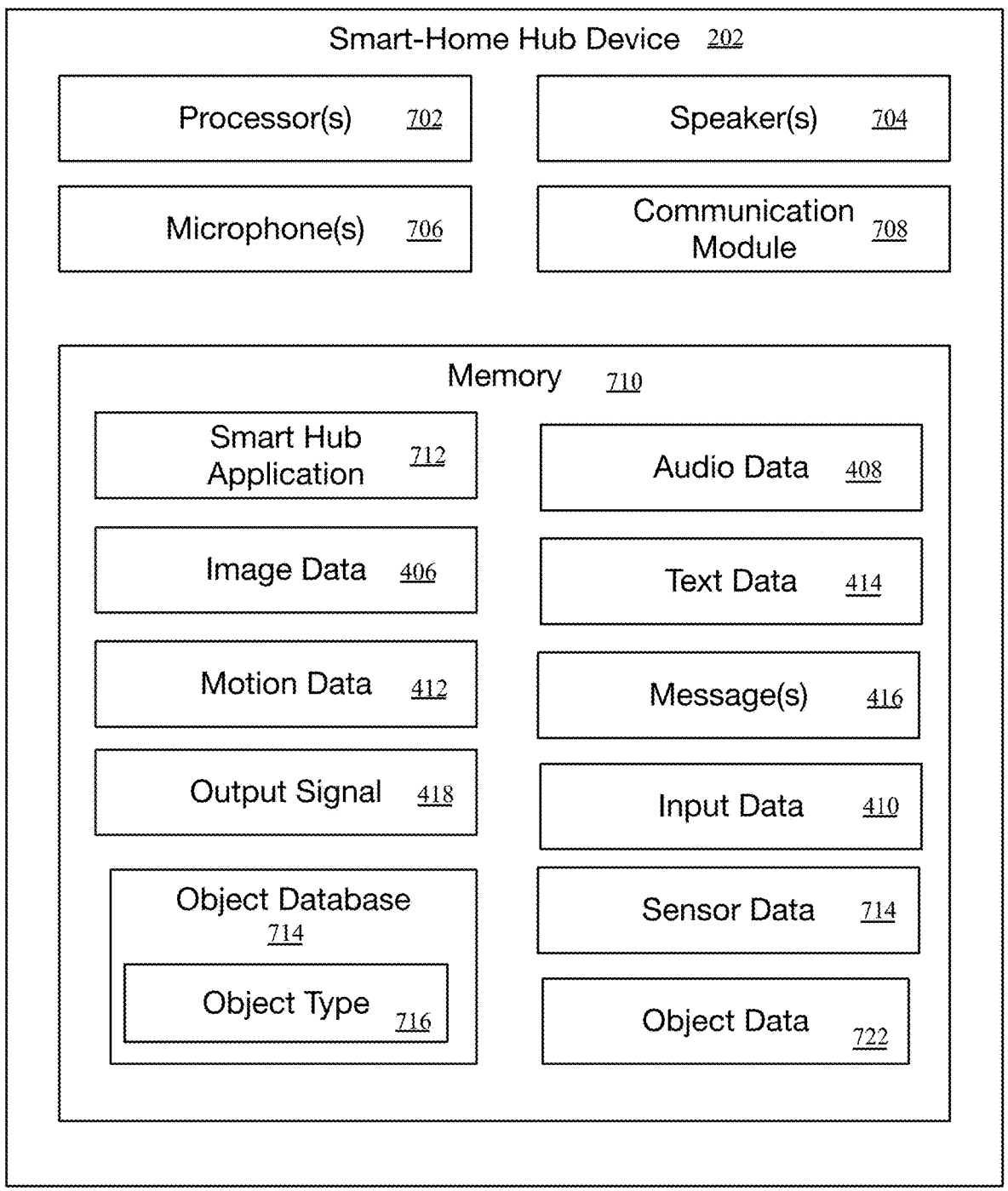
FIG. 7 is a functional block diagram illustrating one example embodiment of a smart-home hub device, according to various aspects of the present disclosure.

FIG. 7 is a functional block diagram illustrating an embodiment of the smart-home hub device 202 (alternatively referred to herein as the "hub device 202"), according to various aspects of the present disclosure. The hub device 202 may be, for example, one or more of a Wi-Fi hub, a smart-home hub, a hub of a home security/alarm system, a gateway device, a hub for a legacy security/alarm system (e.g., a hub for connecting a pre-existing security/alarm system to the network (Internet/PSTN) 212 for enabling remote control of the hub device 202), and/or another similar device. In some examples, the hub device 202 may include the functionality of the VA device 208. The hub device 202 may comprise processor(s) 702 (which may be similar to, and/or include similar functionality as, the processor(s) 310) that are operatively connected to speaker(s) 704, microphone(s) 706, a communication module 708 (which may be similar to, and/or include similar functionality as, the communication module 310), and memory 710 (which may be similar to, and/or include similar functionality as, the memory 402). In some embodiments, the hub device 202 may further comprise one or more of a camera (not shown). In some embodiments, the hub device 202 may not include one or more of the components shown in FIG. 7, such as the speaker(s) 704 and/or the microphone(s) 706.

As shown in the example of FIG. 7, the memory 710 stores a smart-home hub application 712. In various embodiments, the smart-home hub application 712 may configure the processor(s) 702 to receive sensor data from the sensors 204 and/or the automation devices 206. For example, the sensor data may include a current state (e.g., opened/closed for door and window sensors, motion detected for motion sensors, living room lights on/off for a lighting automation system, etc.) of each of the sensors 204 and/or the automation devices 206. In some of the present embodiments, the sensor data may be received in response to sensor triggers. The sensor triggers may be a door opening/closing, a window opening/closing, lights being turned on/off, blinds being opened/closed, etc. As such, the sensor data may include the current state of the sensors 204 and/or the automation devices 206 as well as any updates to the current state based on sensor triggers.

With further reference to FIG. 7, the smart-home hub application 712 may configure the processor(s) 702 to receive the audio data 408, the text data 414, the image data 406, the motion data 412, the input data 410, and/or the messages 416 from the A/V device 210 (in some embodiments, via the backend server 224) using the communication module 708. For example, the hub device 202 may receive and/or retrieve (e.g., after receiving a signal from the A/V device 210 that the A/V device 210 has been activated) the image data 406, the input data 410, and/or the motion data 412 from the A/V device 210 and/or the backend server 224 in response to motion being detected by the A/V device 210. The smart-hub application 712 may then configure the processor(s) 702 to transmit, using the communication module 708, the audio data 408, the text data 414, the image data 406, the motion data 412, the input data 410, and/or the messages 416 to the client device 214, 216, the backend server 224, and/or an additional electronic device (e.g., a second A/V device 210, the automation device(s) 206, the sensor(s) 204, etc.).

As described herein, at least some of the processes of the A/V device 210, the backend server 224, and/or the client device 214, 216 may be executed by the hub device 202.

Each of the processes described herein, including the processes 800, 1100, and 1200 are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 8:
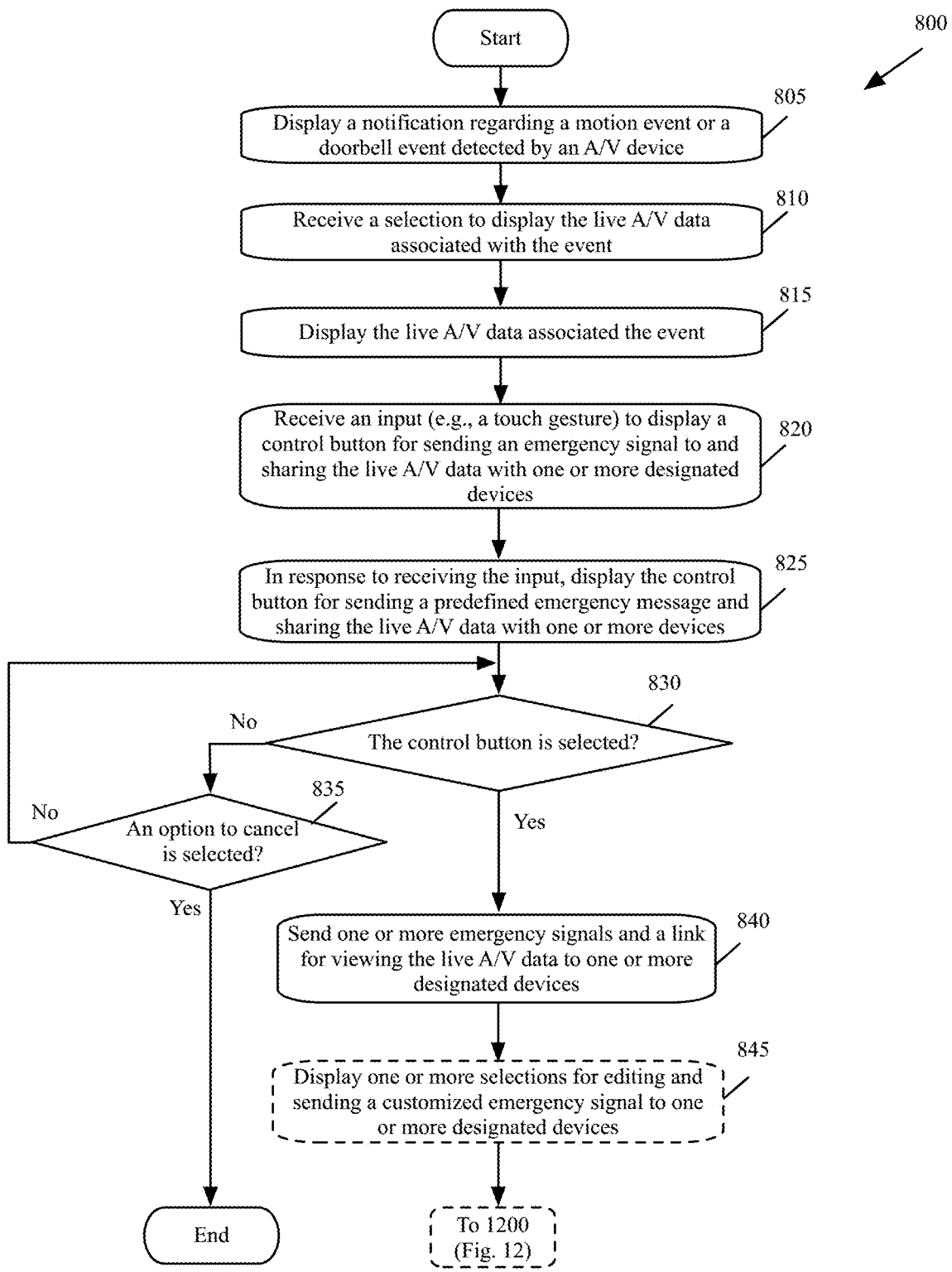
FIG. 8 is a flowchart illustrating an example process for silently sending predefined emergency signals to, and sharing live A/V data with, other devices in response to receiving input, according to various aspects of the present embodiments.

FIG. 8 is a flowchart illustrating an example process 800 for silently sending predefined emergency signals to, and sharing live A/V data with, other devices in response to receiving input (e.g., touch gestures), according to various aspects of the present embodiments. In some of the present embodiments, the process 800 may be performed by one or more processing elements of a client device 100 (FIGS. 1A and 9). With reference to FIG. 8, at block 805, a notification may be displayed regarding a motion event or a doorbell button press event detected by an A/V device. For example, the notification 135 of FIG. 1A may be displayed on the user interface 120 of the client device 100.

In some of the present embodiments, the notification may be received from one or more networked devices that are associated with the client device 100 and the A/V device that has detected the event. In other embodiments, the notification may be received from the A/V device through a local wired/wireless network. An example of signal exchanges for receiving a notification (e.g., a push notification) by a client device is now described with reference to FIG. 9. FIG. 9 is a functional diagram illustrating an embodiment of a system 900 for sending emergency signals and sharing live A/V data captured by one or more A/V devices, according to various aspects of the present disclosure. With reference to FIG. 9, the system 900 may include one or more client devices 100, 922, one or more A/V devices 910, one or more networked devices 220, one or more emergency portals 995, one or more emergency call centers 998, one or more security/alarm monitoring servers 990, and one or more moderating servers 945, all of which are interconnected by one or more networks 912.

An emergency call center 998, such as a public-safety answering point (PSAP) call center in North America, may be a call center responsible for answering calls to an emergency telephone number (e.g., 911 telephone number) for dispatching law enforcement agencies (e.g., police, sheriff, etc.), firefighting services, and ambulance services. An emergency portal 995 may be a computing device (e.g., a server or a client device) associated with an emergency call center 998 and may include an application program, such as the application program 614 of FIG. 6, to receive live A/V data captured by the A/V device(s) 910 from the networked device(s) 930. The application program may provide an interface for an operator to view the live A/V data.

In some localities, the emergency call center(s) 998 may not have the associated emergency portal(s) 995. Accordingly, as described below, some embodiments may send a text (or SMS) message from the client device 100 to the emergency call center(s) 998 in addition to, or in lieu of, sending a message to the emergency portal(s) 995 through the network(s) 912 and the networked device(s) 930.

The networked device(s) 930 may be similar to the backend servers 224 described above with reference to FIG. 2. The network(s) 912 may be one or more of the user's network 218, the network (Internet/PSTN) 212, and the network(s) of servers/backend devices 220 described above with reference to FIG. 2.

One or more of the A/V devices 910 may include a camera 955, a microphone 328 (FIG. 3), a speaker 330 (FIG. 3), a communication interface 312 (FIG. 3), etc. The A/V device(s) 910 may also include one or more motion sensors 326 (FIG. 3) and/or motion detection software to detect motion when an object (e.g., a person 940) appears in the field(s) of view 950 of the camera(s) 955.

With further reference to FIG. 9, an example one of the A/V devices 910 may detect motion when the person 940 appears within the field of view 950 of the camera 955. Alternatively, the example A/V device 910 may be a video doorbell, and may receive a video doorbell event signal when the person 950 presses the video doorbell's front button.

The example A/V device 910 may capture A/V data of the object that has triggered the motion (or the doorbell) event. The example A/V device 910 may send (e.g., by streaming) the A/V data and an event notification to the networked devices 930 through the network(s) 912. There may be one or more A/V devices around a given location (e.g., a given property). Although in the example of FIG. 9 only one A/V device 910 is capturing live A/V data of an emergency event, in other embodiments (e.g., as described below with reference to FIG. 13) several A/V devices may capture the live A/V data related to an emergency event.

When the networked device(s) 930 receive the event notification signal from the example A/V device 910, the networked device(s) 930 may generate a notification for the event and send the event notification to one or more client devices 100, 922 associated with the example A/V device 910. In some embodiments, the event notification may include, among other data, a data structure (e.g., a URL) that links the event to the associated A/V data (e.g., a video clip) being stored, e.g., at the networked device(s) 930.

With reference to FIG. 8, the event notification displayed at block 805 may be received from the networked device(s) 912 of FIG. 9 after the A/V device 910 detects a motion event or a doorbell event. With further reference to FIG. 8, at block 810, a selection may be received to display the live A/V data associated with the event. For example, a selection of the notification 135 may be received (e.g., as a result of tapping on the notification) as shown in stage 101 of FIG. 1A. In response to receiving (at block 810) the selection, at block 815, the live A/V data associated with the event may be displayed. For example, the live A/V data associated with the event as shown in stage 102 of FIG. 1A may be displayed.

At block 820, an input (e.g., a touch gesture) may be received to display a control button for sending an emergency signal to, and sharing the live A/V data with, one or more designated devices. For example, an input such as the touch gesture as described with reference to stage 102 of FIG. 1A may be received. In response to receiving the input, at block 825, a control button for sending a predefined emergency message to, and sharing the live A/V data with, one or more designated devices may be displayed. For example, the panic button 190 as shown in FIGS. 1A and 9 may be displayed.

At block 830, it may be determined whether the control button is selected. For example, it may be determined (at block 830) whether the panic button 190 (FIGS. 1A and 9) is selected. In some embodiments, the user may press a finger on the display 130 (if the display 130 is a touchscreen, FIG. 1A) of the client device 100 and over a certain area where the control button 190 is displayed, and may hold the finger for a specific time period (e.g., 3 seconds, 5 seconds, etc.) in order to select the panic button 190. In other embodiments, a simple selection of the panic button 190 (e.g., by tapping on the panic button 190), and without any particular touch gesture (e.g., holding the finger for a time period), may result in the selection of the panic button 190.

With further reference to FIG. 8, when it is determined (at block 830) that the control button is not selected, it may be determined (at block 835) whether an option to cancel sending the emergency signal and sharing the live A/V data is selected. For example, it may be determined (at block 835) whether an option such as the return button 191 (FIGS. 1A and 9) to cancel the operation of sending the emergency signal and sharing of the live A/V data is selected. When it is determined (at block 835) that a cancel option is selected, the processing may end. Otherwise, the processing may return to block 830, which is described above.

With continued reference to FIG. 8, when it is determined (at block 830) that the control button is selected, one or more emergency signals and a link (e.g., a URL) for viewing the live A/V data associated with the emergency event may be sent (at block 840) to the designated device(s). In some aspects of the present embodiments, the emergency signal may be sent (at block 840) as a text message (also referred to as a short message or an SMS message) to an emergency call center, such as a PSAP call center in North America. With reference to FIG. 9, the client device 100 may send the text message to an emergency call center 998 (e.g., the client device 100 may send the text message to an emergency telephone number such as 911).

The text message may include the predefined emergency message, a link (e.g., a URL) for receiving live video of the emergency event, and/or a location of the A/V device. The location may be a street address, or the latitude and longitude of the A/V device. The location may also be an approximate location, such as an identification of the closest intersection, the city block description (e.g., "100 block of Main Street"), etc. In some of the present embodiments, some of the designated devices, such as the devices associated with emergency services and/or friends, may receive the exact location of the A/V device, while the devices associated with the neighbors may receive the approximate location of the A/V device (e.g., for the neighbors to be alerted, stay inside, call for help, etc.).

In some aspects of the present embodiments, the emergency signal(s) may be sent (at block 840) as a message from the client device 100 of FIG. 9 to the networked device(s) 930 through the network(s) 912. The message may include the predefined emergency message, a link (e.g., a URL) for receiving live video of the A/V data of the emergency event, and/or a location (e.g., an exact location or an approximate location as described above) of the A/V device. The networked device(s) 930 may then send the emergency signal(s) to one or more designated devices (e.g., as a message that is sent through network(s) 912 to the emergency portal(s) 995, the client device(s) 922 of neighbors, friends, etc., and/or the security/alarm monitoring server(s) 990).

In some aspects of the present embodiments, even when a user selects the option to send the approximate location of the A/V device (e.g., as described above with reference to step 108 of FIG. 1B), the emergency portal(s) 995, the security/alarm monitoring server(s) 990, and/or the client devices 922 of the designated friends may receive the exact location of the A/V device while the client device(s) 922 of the neighbors may get the approximate location of the A/V device.

In some of the present embodiments, the one or more emergency signals sent (at block 840 of FIG. 8) may include a first signal that may be sent to the emergency portal(s) 995 of one or more designated law enforcement agencies and a second signal that may be sent to a designated set of client devices 922 (e.g., the client devices that are associated with the same neighborhood where the user lives). In some of the present embodiments, when the live video footage is received from an A/V device 910 that is installed at a property within a neighborhood, the second signal may be sent to at least one client device 922 of every user that is associated with a geographic network of users associated with the neighborhood. In some aspects of the present embodiments, the neighborhood area may have been predefined (e.g., based on boundaries of the neighborhoods in a city). In some of the present embodiments, the user may be able to modify the predefined neighborhood areas. Additionally, in one aspect of the present embodiments, instead of, or in addition to modifying the neighborhood area, the user may be able to directly designate the client devices of one or more users as the client devices to which the second signal will be sent (even if one or more of the designated client devices are not within the predefined neighborhood area or the modified neighborhood area). For example, the user may set the neighborhood area by accepting the predefined neighborhood area, or by creating the modified neighborhood area, and then may designate one or more additional client devices to which the second signal will be sent.

Figure 10:
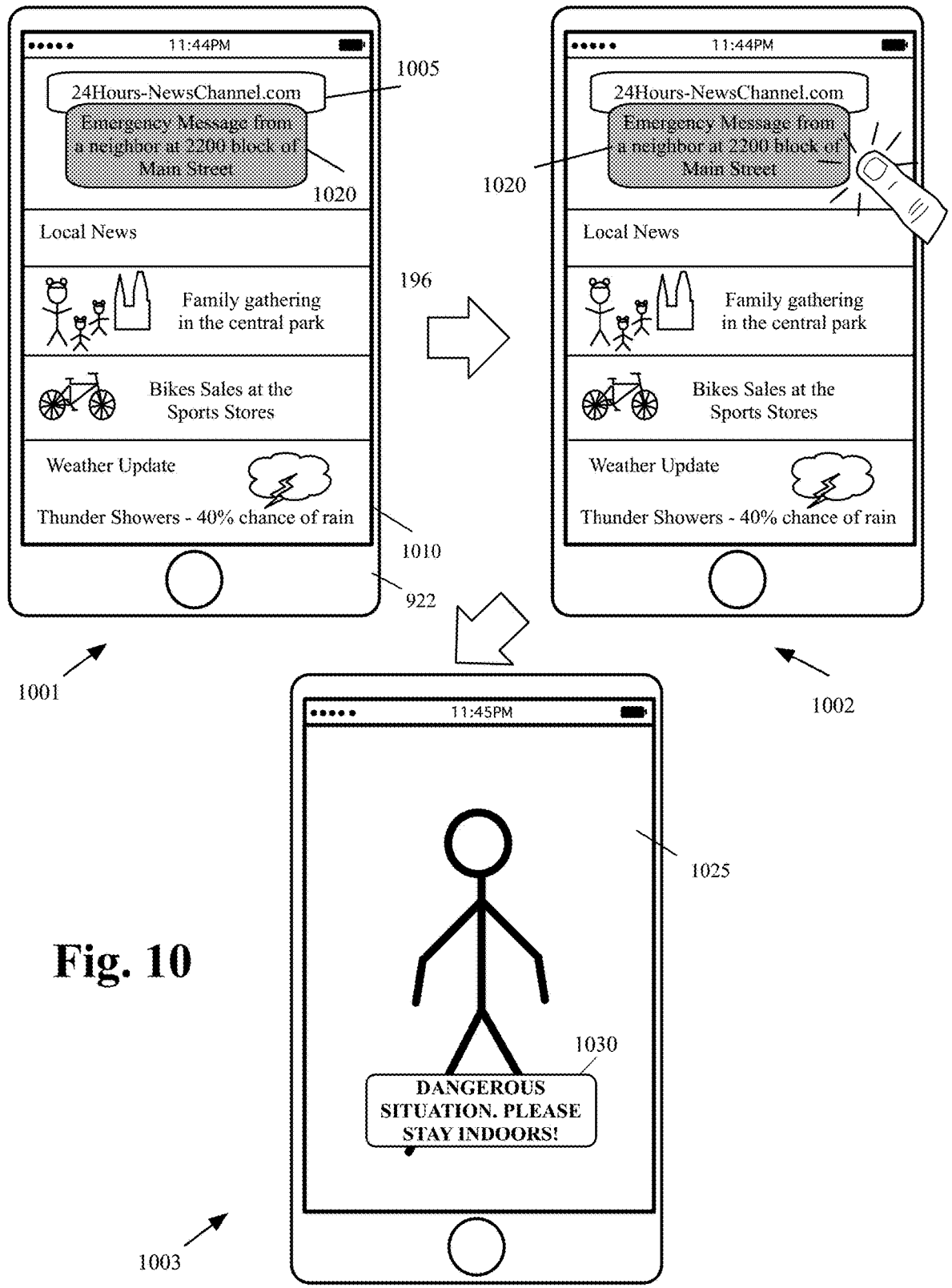
FIG. 10 is a schematic front view of a client device that may receive an emergency notification from the client device of a neighbor, according to various aspects of the present embodiments.

In some of the present embodiments, the second signal (e.g., the signal that is sent to the designated client devices of the neighbors) may include a notification (e.g., a push notification) to notify the neighbors of an emergency event. FIG. 10 is a schematic front view of a client device 922 that may receive an emergency notification from the client device 100 of a neighbor, according to various aspects of the present embodiments. The figure, as shown, includes three stages 1001-1003. As shown in stage 1001, the client device 922 may be executing an application unrelated to the management and control of the A/V devices. In the specific example of FIG. 10, the client device 922 may be executing a browser application that is displaying a news website 1005 on the display 1010 of the client device 922.

With continued reference to stage 1001 of FIG. 10, the client device 922 may receive and display an emergency notification 1020 related to an emergency event captured by an A/V device 910 (FIG. 9) of another client device 100 (FIG. 9). The emergency notification 1020 may display an alert and may include the address of the property associated with the A/V device 910 (FIG. 9). In the example of FIG. 10, the address identifies an approximate location of the A/V device 910. In some embodiments, the emergency notification 1020 may also be displayed with a specific color to draw attention to the emergency event.

The emergency notification 1020, in some aspects of the present embodiments, may be a push notification that may be displayed on the display 1010 of the client device 922 (e.g., as a banner) even when the client device 922 is not executing the application related to the management and control of the A/V devices. In some aspects of the present embodiments, the emergency notification 1020 may be displayed on the display 1010 of the client device 922 when the client device 922 is in a locked mode. In some aspects of the present embodiments, a device is in the locked mode when only a reduced set of controls can be used to provide input to the device. In some aspects of the present embodiments, when the display 1010 of the client device 922 is turned off (e.g., to save battery power), the client device 922 may turn on the display 1010 and display the emergency notification 1020. In addition to, or in lieu of, displaying a banner, the client device 922 may play an audio sound (such as one or more tones, one or more chimes, etc.) and/or the client device 922 may vibrate one or more times to draw the attention of the user of the client device.

With continued reference to FIG. 10, the emergency notification 1020 may remain on the display of the client device 922 until the user of the client device 922 accepts or rejects the emergency notification 1020. For example, in some of the present embodiments, the emergency notification 1020 may be accepted by selecting (e.g., by tapping on a touchscreen or by using a pointing device) the emergency notification 1020. The emergency notification 1020 may also be rejected by, for example, sliding the notification 1020 to the right or the left and selecting a delete option, or simply by sliding the notification 1020 up/down (without selecting any other option).

As shown in stage 1002, the user has selected the emergency notification 1020 (e.g., by tapping on the displayed emergency notification 1020). Stage 1003 of FIG. 10 shows that after the selection of the emergency notification 1020, live video is displayed in the display area 1025 on the display 1010 of the client device 922. The display area 1025 may also display an emergency message 1030 that was included in the second emergency signal that was sent from the client device 100 (FIG. 9) to the client devices 912 (e.g., of the neighbors).

In some embodiments, the emergency signals that are sent from the client device 100 to the networked device(s) 130 may be moderated prior to sending the emergency signals to the designated devices. In some embodiments, the emergency signals sent to all designated devices (e.g., the client device(s) 922, the security/alarm monitoring server(s) 990, and the emergency portal(s) 995) may be moderated. In some embodiments, the emergency signals sent to some of the designated devices (e.g., the client device(s) 922 of the neighbors or the client device(s) 922 of the neighbors and friends) may be moderated while the emergency signals sent to other designated devices (e.g., the emergency portal(s) 995 and/or the security/alarm monitoring server(s) 990) may not be moderated. Yet, some embodiments may not include the moderating server(s) 945 and may not moderate the emergency signals. In some embodiments, the text (or SMS) messages that are sent from the client device 100 to the emergency call center(s) 998 may not be moderated.

With further reference to FIG. 9, the emergency signal and the link to the live A/V data may be sent from the networked device(s) to the moderating server(s) 945. The moderating server(s) 945 may be operated by one or more moderators who may review the emergency signals and/or the live A/V data to (1) confirm that there is an actual emergency situation and/or (2) provide additional information to the live video and/or the emergency message to assist emergency services, neighbors, friends, etc., whose devices may receive the emergency signal and the link to the live A/V data. The moderator may also delete some of the content of the message and/or the A/V data (e.g., edit the video to only include a small portion of the video that shows a suspicious person).

In some of the present embodiments, the moderating server(s) 945 may then forward the emergency signal (with or without additional data added by a moderator) and the link to the live A/V data to one or more designated devices 995, 922, and/or 990. In other embodiments, the moderating server(s) 945 may forward the emergency signal (with or without additional data added by a moderator) and the link to the live A/V data to networked device(s) 930 and the networked devices 930 may then forward the emergency signal and the link to the live A/V data to the designated devices. Although shown as separate devices, in one aspect of the present embodiments, the moderating server(s) 945 may be part of the backend/networked devices 930 (FIG. 9).

With further reference to FIG. 8, at block 845, one or more selections for editing and sending a customized emergency signal (e.g., a modified text message) to one or more designated devices may be displayed. The details of the block 845 are described below with reference to FIG. 12. The processing may then end.

The specific operations of the process 800 may not be performed in the exact order shown and described. Furthermore, the specific operations described with reference to FIG. 8 may not be performed in one continuous series of operations, in some aspects of the present disclosure, and different specific operations may be performed in different embodiments. For instance, in some aspects of the present embodiments, in addition to sending the emergency signal (s) and the link to the live A/V data received from the A/V device (e.g., the A/V device 910 of FIG. 9), an activation signal may be sent to one or more other A/V devices associated with a property where the A/V device 910 is located. The activated A/V device(s) may start recording the surroundings of the property to record other potential perpetrators situated around the property, and/or to record the same perpetrator moving to different locations around the property. Sharing the live A/V data from multiple A/V devices is described below with reference to FIG. 13.

Figure 11:
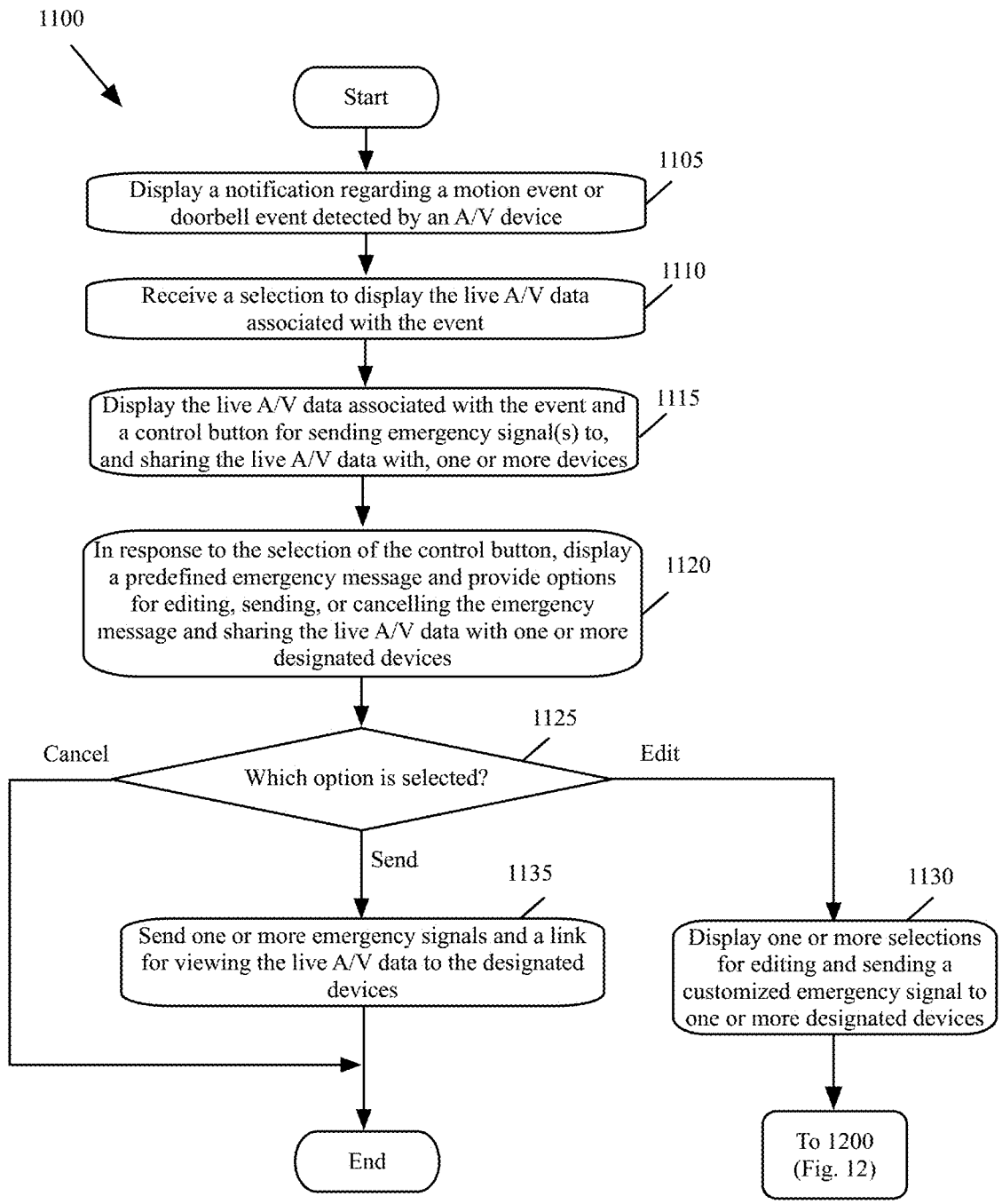
FIG. 11 is a flowchart illustrating an example process for silently sending predefined or customized emergency signals to, and sharing live A/V data with, other devices, according to various aspects of the present embodiments.

FIG. 11 is a flowchart illustrating an example process 1100 for silently sending predefined or customized emergency signals to, and sharing live A/V data with, other devices, according to various aspects of the present embodiments. In some of the present embodiments, the process 1100 may be performed by one or more processing elements of a client device 100 (FIGS. 1C and 9).

With reference to FIG. 11, the process 1100 may display (at block 1105) a notification regarding a motion event or a doorbell event detected by an A/V device. For example, the process may display the notification 135 of FIG. 1C on the user interface 120 of the client device 100. The process 1100 may receive the notification from the networked device(s) 930 or the A/V device 910 as described above with reference to block 805 (FIG. 8).

With further reference to FIG. 11, at block 1110, a selection to display the live A/V data associated with the event may be received. For example, a selection of the notification 135 may be received (e.g., by tapping on the notification as shown in stage 111 of FIG. 1C). In response to receiving (at block 1110) the selection, at block 1115, the live A/V data associated with the event and a control button for sending an emergency signal to, and sharing the live A/V data with, one or more designated devices may be displayed. For example, the live A/V data associated with the event and a panic button 145 as shown in stage 112 of FIG. 1C may be displayed.

In response to the selection of the control button, a predefined emergency message may be displayed (at block 1120) and options may be provided for editing, sending, or canceling one or more emergency signal(s) to, and the sharing of the live A/V data with, one or more designated devices. For example, the predefined message 161, the submit button 163, and the return option 191 may be displayed as shown in stage 113 of FIG. 1C.

At block 1125, the option that is selected may be determined. When it is determined (at block 1125) that the cancel option is selected, the processing may end. For example, it may be determined that the return option 191 is selected in stage 113 of FIG. 1C and the sending of the emergency signals and the sharing of the live A/V data may be canceled.

With reference to FIG. 11, when it is determined (at block 1125) that the edit option is selected, one or more selections may be displayed (at block 1130) for editing and sending a customized emergency signal to one or more designated devices. The details of block 1130 are described in the process 1200 illustrated in FIG. 12.

With further reference to FIG. 11, when it is determined (at block 1125) that the send option is selected, one or more emergency signals and a link (e.g., a URL) for viewing the live A/V data may be sent (at block 1135) to the designated devices. For example, it may be determined (at block 1125) that the submit button 163 in stage 113 of FIG. 1C is selected. One or more signals may then be sent (at block 1135) to the designated devices, for example, as described above with reference to block 840 (FIG. 8). The processing may then end.

The specific operations of the process 1100 may not be performed in the exact order shown and described. Furthermore, the specific operations described with reference to FIG. 11 may not be performed in one continuous series of operations, in some aspects of the present disclosure, and different specific operations may be performed in different embodiments. For instance, in some aspects of the present embodiments, in addition to sending the emergency signal (s) and the link to the live A/V data received from the A/V device (e.g., the A/V device 910 of FIG. 9), an activation signal may be sent to one or more other A/V devices associated with a property where the A/V device 910 is located. The activated A/V devices may start recording the surroundings of the property to record other potential perpetrators situated around the property, and/or record the same perpetrator moving to different locations around the property. Sharing the live A/V data from multiple A/V devices is described below with reference to FIG. 13.

Figure 12:
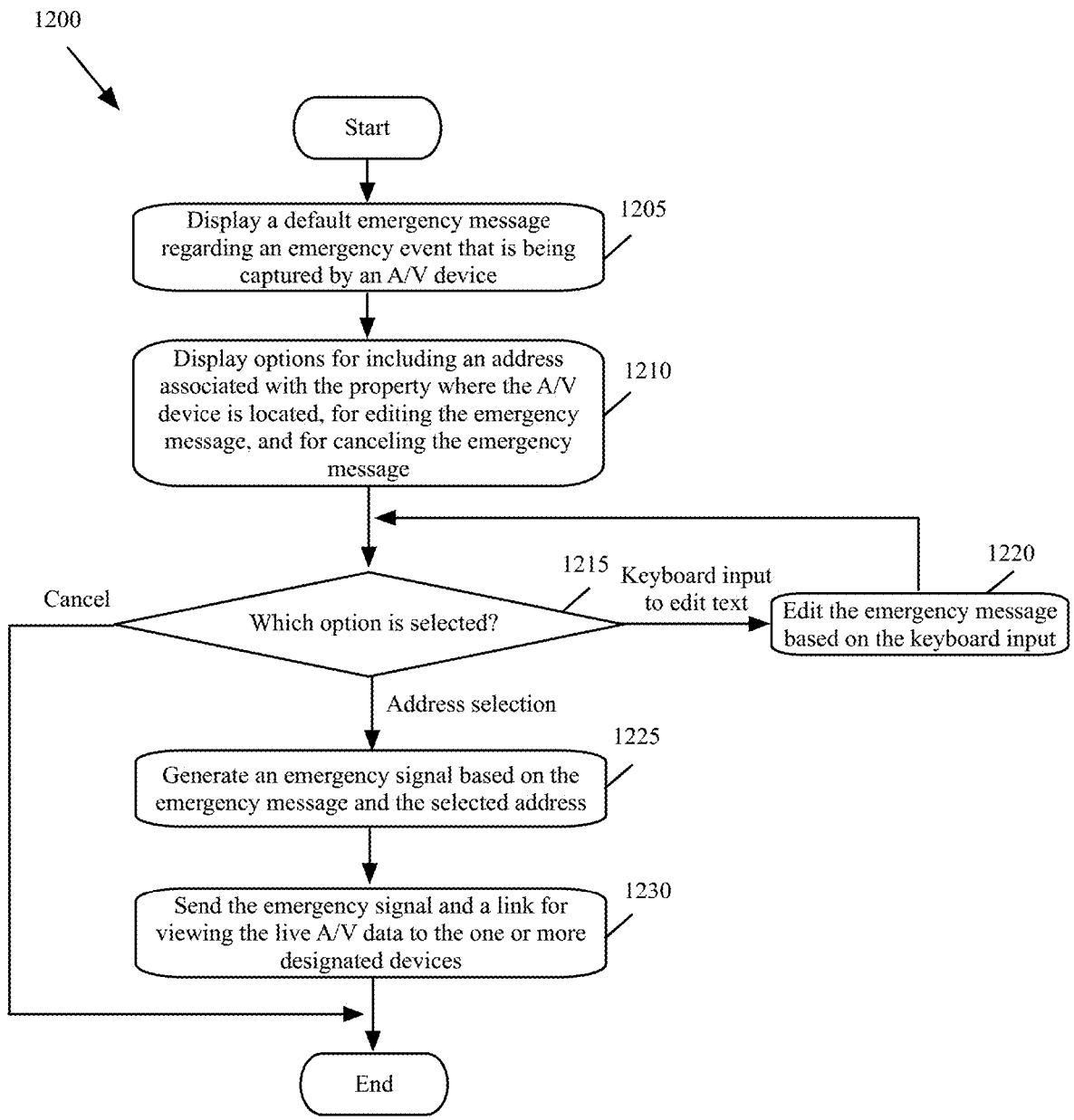
FIG. 12 is a flowchart illustrating an example process for editing and sending customized emergency message(s) associated with the live A/V data of an emergency event, according to various aspects of the present embodiments.

FIG. 12 is a flowchart illustrating an example process 1200 for editing and sending customized emergency message(s) associated with the live A/V data of an emergency event, according to various aspects of the present embodiments. In some of the present embodiments, the process 1200 may be performed by one or more processing elements of a client device 100 (FIGS. 1B and 9). The process 1200, in some of the present embodiments, may provide further details of block 855 of FIG. 8 or block 1130 of FIG. 11.

With reference to FIG. 12, a default emergency message regarding an emergency event that is being captured by an A/V device may be displayed (at block 1205). For example, a default message may be displayed in the display area 174 as shown in stage 106 of FIG. 1B. At block 1210, one or more options may be displayed for including an address (or other location information) associated with the emergency event, for editing the emergency message, or for cancelling the emergency message. For example, at block 1210, the option 178 ("Send Exact Address") of FIG. 1B may be displayed for sending an exact address and the option 179 ("Send Approximate Address") may be displayed for sending an approximate location associated with the property where the A/V device that is capturing the live A/V data of the emergency is located. In some of the present embodiments, the exact address 178 and the approximate location 179 may be predefined (e.g., by a user).

At block 1210, an option for editing the emergency message may be provided. In some embodiments, any key on the keyboard 177 of FIG. 1B may be selected to add, delete, or modify a character in the emergency message. The emergency message may be edited as long as the characters on the keyboard are selected. At block 1210, an option to cancel the emergency message may be displayed. For example, at block 1210, the option 188 ("Cancel") of FIG. 1B may be displayed to cancel the emergency message.

At block 1215, the option that is selected may be determined. When it is determined (at block 1215) that a keyboard input is made (e.g., a key on the keyboard 177 of FIG. 1B is selected) to edit the emergency message, the emergency message may be edited (at block 1220) based on the keyboard input. For example, the emergency message displayed in the display area 176 may be edited based on an input from the keyboard 177 and the current location 176 pointed by a pointing device. The processing may return to block 1215 to allow the user to either continue editing the emergency message by selecting another key on the keyboard or select other options to send or cancel the emergency message.

When it is determined (at block 1215) that the cancel option is selected, the processing may end. For example, it may be determined that the cancel option 188 is selected in stage 106 of FIG. 1B and the sending of the emergency signals and the sharing of the live A/V data may be canceled. When it is determined (at block 1215) that the address selection option is selected, an emergency signal may be generated (at block 1225) based on the emergency message and the selected address.

Next, one or more emergency signals and a link (e.g., a URL) for viewing the live A/V data may be sent (at block 1230) to the designated devices. For example, the one or more signals may be sent to the designated devices as described above with reference to block 840 (FIG. 8). The processing may then end.

The specific operations of the process 1200 may not be performed in the exact order shown and described. Furthermore, the specific operations described with reference to FIG. 12 may not be performed in one continuous series of operations, in some aspects of the present disclosure, and different specific operations may be performed in different embodiments. For instance, in some aspects of the present embodiments, a blank display area may be provided (at block 1205) for entering a customized emergency message instead of displaying a default message.

As described above, in some aspects of the present embodiments, when the user selects a panic button on the client device, in addition to the emergency signals that are sent to the designated neighbor devices, the emergency call center, and the alarm system monitoring center, an activation signal may be sent to one or more other A/V devices that are associated with the client device and/or the user. For example, if the client device receives live video recorded by a first A/V device installed at the property of the user, and the user, in response to watching the video, selects a panic button, an activation signal may be sent to any other A/V device(s) that are installed at the same property to activate those other A/V devices. The activated A/V devices may advantageously record other potential perpetrators around the property, and/or the same perpetrator at different locations around the property. For example, FIG. 13 is a functional diagram illustrating an embodiment of a system that uses several A/V devices to capture and share live A/V data during an emergency, according to various aspects of the present disclosure. The figure, as shown, includes two stages 1301 and 1302.

With reference to FIG. 13, stage 1301 shows the client device 100 displaying the live A/V data captured by a first A/V device 910. The displayed live A/V data may show images of a person 940. As shown, the display 130 of the client device 100 may display a panic button 1310, for example, as described above with reference to stage 103 of FIG. 1A, or stage 112 of FIG. 1C. Stage 1301 also shows that the user of the client device 100 may select the panic button 1310 (e.g., by tapping on the panic button 1310 on the display 130 (e.g., touchscreen) of the client device 100 or by selecting the panic button 1310 using a pointing device such as a mouse) in order to send emergency signals and share live A/V data of an emergency event with other devices (e.g., as described above with reference to FIG. 1A).

In some of the present embodiments, after the panic button 1310 is selected, the client device 100 may send an activation signal (e.g., in addition to the other above-described emergency signals) to one or more other A/V devices associated with the property 1315 where the first A/V device 910 is located. In some of the present embodiments, the client device 100 may send the activation signal to the networked device(s) 930 (FIG. 9) through the network(s) 912 and the networked device(s) 930 may send the activation signal through the network(s) 912 to the other A/V devices associated with the property 1315 (e.g., to a second A/V device 1320). In other embodiments, the client device may send the activation signal to the other A/V device(s) 1320 through a local network such as the user's network 218 of FIG. 2. In some of the present embodiments, the client device may send the activation signal to the other A/V devices in response to the selection of one of the options 178 ("Send Exact Address") or 179 ("Send Approximate Location") of FIG. 1B.

With reference to stage 1302 of FIG. 13, the second A/V device 1320 has been activated and may be transmitting A/V data to the networked devices 930 (FIG. 9) through the network(s) 912. The second A/V device 1320 may capture images of the first person 940 from a different angle than the first A/V device 910 or may capture images of a second person 1350.

The networked devices 930 may analyze the live A/V data from the second A/V device 1320 and may determine, based on the analysis, to send the live A/V data captured by the second A/V device 1320 to the client device 100 to display on a split screen. The networked devices 930, based on the analysis, may send the live A/V data captured by the second A/V device 1320 to any designated device(s) (e.g., one or more of the emergency portal(s) 995, the client devices 922, and/or the security/alarm monitoring server(s) 990 of FIG. 9) that has/have received the emergency notification for the emergency event (e.g., as shown in step 1001 of FIG. 10) and is/are currently receiving live A/V data of the event (e.g., as shown in step 1003 of FIG. 10). The networked devices 930 may determine, based on the analysis, that the live A/V data may be stored (e.g., at the remote storage device(s) 222 of FIG. 2) for later review without sending to the client device 100.

When the client device 100 receives the live A/V data from the second A/V device 1320, the display 130 of the client device 100 may show the live A/V data received from both of the A/V devices 910 and 1320 on a split screen. In the example of FIG. 13, the display 130 of the client device 100 is split into two sections 1360 and 1365. The display section 1360 shows the live A/V data captured by the first A/V device 910 (e.g., the display section 1360 may show the images of the first person 940). The display section 1365 shows the live A/V data captured by the second A/V device 1320 (e.g., the display section 1365 may show the images of the second person 1350).

When there are several A/V devices 210 that are associated with the property 1315, the networked device(s) 930 may analyze the live A/V data captured by the A/V devices 210 and may determine, based on the analysis, to send the live A/V data captured by one or more of the A/V devices 210 to the client device 100 to display on a split screen (e.g., a screen divided into two sections, three sections, etc.). The networked device(s) 930 may use image processing and/or computer vision to find other possible intruders on the property and/or to locate the first person 940 as he or she moves around the property 1315. The networked device(s) 930 may send the live A/V data from the one or more A/V devices 210 that are capturing the images of a person 1350 and may not send the live A/V data from the A/V devices 210 that are not capturing the images of a person.

In some of the present embodiments, when the networked device(s) 930 send live data from additional A/V device(s) 210 to the client device 100 regarding the emergency event, the networked device(s) 930 may update the link (or URL) that is sent to other designated devices to include the live A/V data captured by the additional A/V device(s) 210 in order for the other designated device to display on a split screen. For example, if a neighbor's client device that has received an emergency notification regarding the emergency event at the property 1315 and is displaying (e.g., as shown in step 1003 of FIG. 10) the live A/V data captured by the A/V device 940, the neighbor's client device 922 (FIG. 10) may receive an updated link that includes live A/V data from another A/V device 210 if the other A/V device 210 is activated and the networked device(s) 930 have determined that the live A/V data from the other A/V device 210 is to be sent to the client device 100 and to other designated devices that have received the emergency notification regarding the emergency event. The display of the neighbor's client device may then display the A/V data from the two A/V devices 910 and 1320 in a split screen similar to the display 130 of the client device 100 in step 1302 of FIG. 13.

Figure 14:
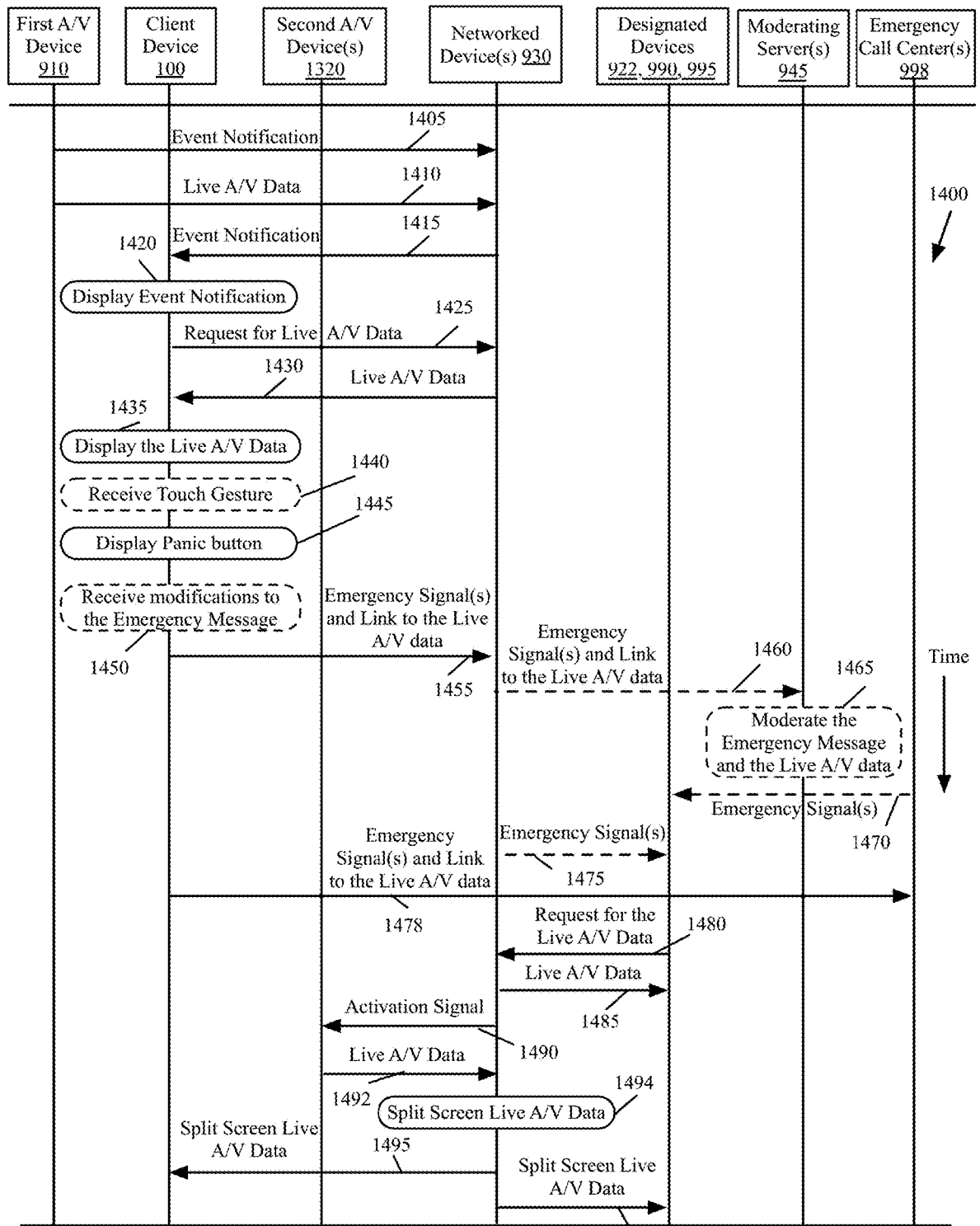
FIG. 14 is an example sequence diagram illustrating data items exchanged between devices in a communication system for silently sending emergency signals to, and sharing live A/V data with, other devices, according to various aspects of the present disclosure.

FIG. 14 is an example sequence diagram 1400 illustrating data items exchanged between devices in a communication system for silently sending emergency signals to, and sharing live A/V data with, other devices, according to various aspects of the present disclosure. With reference to FIG. 14, a first A/V device 910 may send an event notification 1405 to the networked device(s) 930. For example, the A/V device 910 (FIG. 9) may detect the presence of the person 940 in the field of view 950, or the A/V device 910 may receive a push of the doorbell button.

With further reference to FIG. 14, the first A/V device 910 may activate its camera and may send live A/V data 1410 to the networked device(s) 930. For example, the A/V device 910 (FIG. 9) may activate the camera 955, capture live A/V data, and send the live A/V data (e.g., by streaming) to the networked device(s) 930. The networked device(s) 930 may then send an event notification 1415 to the client device 100. For example, the networked device(s) 930 may send the event notification 135 (FIGS. 1A and 1C) to the client device 100.

With continued reference to FIG. 14, the client device 100 may display (at block 1420) the event notification. For example, the client device 100 (FIGS. 1A and 1C) may display the event notification 135 on the display 130 of the client device 100. The client device 100 may then send a request for live A/V data 1425 to the networked device(s) 930. For example, the client device 100 may send a request for the live A/V data in response to the selection of the notification 135, as shown in stage 101 of FIG. 1A or stage 111 of FIG. 1C.

With further reference to FIG. 14, the networked device(s) 930 may send, for example by streaming, the live A/V data 1430 to the client device 100. For example, the networked device(s) 930 (FIG. 9) may transmit the live A/V data to the client device 100. The client device may then display (at block 1435) the live A/V data. For example, the client device 100 may display the live A/V data, as shown in stage 102 of FIG. 1A or stage 112 of FIG. 1C.

In some of the present embodiments, the client device 100 may receive (at block 1440) a touch gesture (or other input), and may display (at block 1445) a panic button in response to receiving the touch gesture. For example, as shown in stage 102 of FIG. 1A, the client device 100 may receive a touch gesture, and may display the panic button 190 (e.g., partially superimposed on the live A/V data). In other embodiments, the client device 100 (FIG. 1C) may display the panic button 190 on the display 130 of the client device without receiving a touch gesture or other input (e.g., as described above with reference to stage 112 of FIG. 1C). In these embodiments, block 1440 of FIG. 14 may be omitted.

With further reference to FIG. 14, the client device 100 may, in some of the present embodiments, receive modifications to the emergency message (at block 1450) from the user of the client device prior to sending an emergency signal to the networked device(s). For example, as shown in FIG. 1B, the user may be provided with a user interface to edit the emergency message displayed in the display area 174.

With continued reference to FIG. 14, the client device may generate and send one or more emergency signals and a link to the live A/V data 1455 to the networked device(s) 930, for example, as described above with reference to block 840 of FIG. 8 or block 1135 of FIG. 11. The emergency signal(s) may include an address associated with the property where the first A/V device 910 is located.

In the embodiments that may require moderation of the emergency signal, the networked device(s) 930 may send the emergency signals and the link to the live A/V data 1460 to the moderating server(s) 945. For example, the networked device(s) 930 may send the emergency signal(s) and a link to the live A/V data to the moderating server(s) 945, as described above with reference to FIG. 9. The emergency signal(s) may include an address associated with the property where the A/V device 910 is located.

With reference to FIG. 14, the moderating server(s) 945 may moderate (at block 1465) the emergency signal(s). For example, the moderating server(s) 945 may add to, modify, and/or delete all of or a portion of the emergency message that is included in the emergency signal(s). The moderating server(s) 945 may also moderate (at block 1460) the live A/V data to provide more information for the recipient's devices. The moderating server(s) 945 may then send the emergency signal(s) and the link to the live A/V data 1470 (with or without moderation) to one or more of the designated device(s) 922, 990, 995, for example as described above with reference to FIG. 9. In some embodiments, the moderating server(s) 945 may forward (not shown) the emergency signal (with or without additional data added by a moderator) and the link to the live A/V data to the networked device(s) 930, and the networked devices 930 may then forward the emergency signal and the link to the live A/V data to the designated device(s) 922, 990, 995. Although shown as separate devices, in one aspect of the present embodiments, the moderating server(s) 945 may be part of the networked device(s) 930.

In some embodiments, the emergency signals sent to some of the designated devices (e.g., the client device(s) 922 of the neighbors and/or the client device(s) 922 of the neighbors and the friends) may be moderated while the emergency signals sent to other designated devices (e.g., the emergency portal(s) 995 and/or the security/alarm monitoring server(s) 990) may not be moderated. Some embodiments may not include the moderating server(s) 945 and may not moderate the emergency signals. With reference to FIG. 14, for the designated devices that do not require moderation, or in the embodiments that do not moderate the emergency signals, the networked device(s) 930 may send the emergency signal(s) and the link to the live A/V data 1475 to some or all of the designated devices 922, 990, 995. The emergency signal(s) may include an address associated with the property where the A/V device 910 is located.

With continued reference to FIG. 14, the client device 100 may send the emergency signal and a link to the live A/V data 1478 as a text (or SMS) message to the emergency call center(s) 998. The networked device(s) 930 may receive a request for the live A/V data 1480 from one or more of the devices 922, 990, 995. The networked device(s) 930 may send, for example by streaming, the live A/V data 1485 to the requesting devices 922, 990, 995.

With reference to FIG. 14, the networked device(s) 930 may send an activation signal 1490 to one or more second A/V devices 1320 that are associated with the same property as the property where the first A/V device 910 is located. For example, the networked device(s) 930 may send an activation signal to activate one or more second A/V devices 1320, as described above with reference to step 1302 of FIG. 13. In response, the second A/V devices 1320 may activate their cameras and may send, e.g., by streaming, the live A/V data 1492 captured by their cameras to the networked device(s) 930.

The networked device(s) 930 may generate (at block 1494) split-screen live A/V data (e.g., as described above with reference to FIG. 13), and may send the split-screen live A/V data 1495 to the client device 100. The networked device(s) 930 may also send the split-screen live A/V data 1497 to one or more other designated devices 922, 990, and/or 995.

In some of the present embodiments, the client device 100 may further provide an option for the user of the client device 100 to generate a customized emergency message and include the customized emergency message in another emergency signal, as described above with reference to FIG. 1B. In these embodiments, the client device 100 of FIG. 14 may receive modifications to a predefined emergency message (or to a blank emergency message), and may send the customized emergency message to the networked device(s) 930 using similar steps as described above with reference to steps 1450 and 1455.

Figure 15:
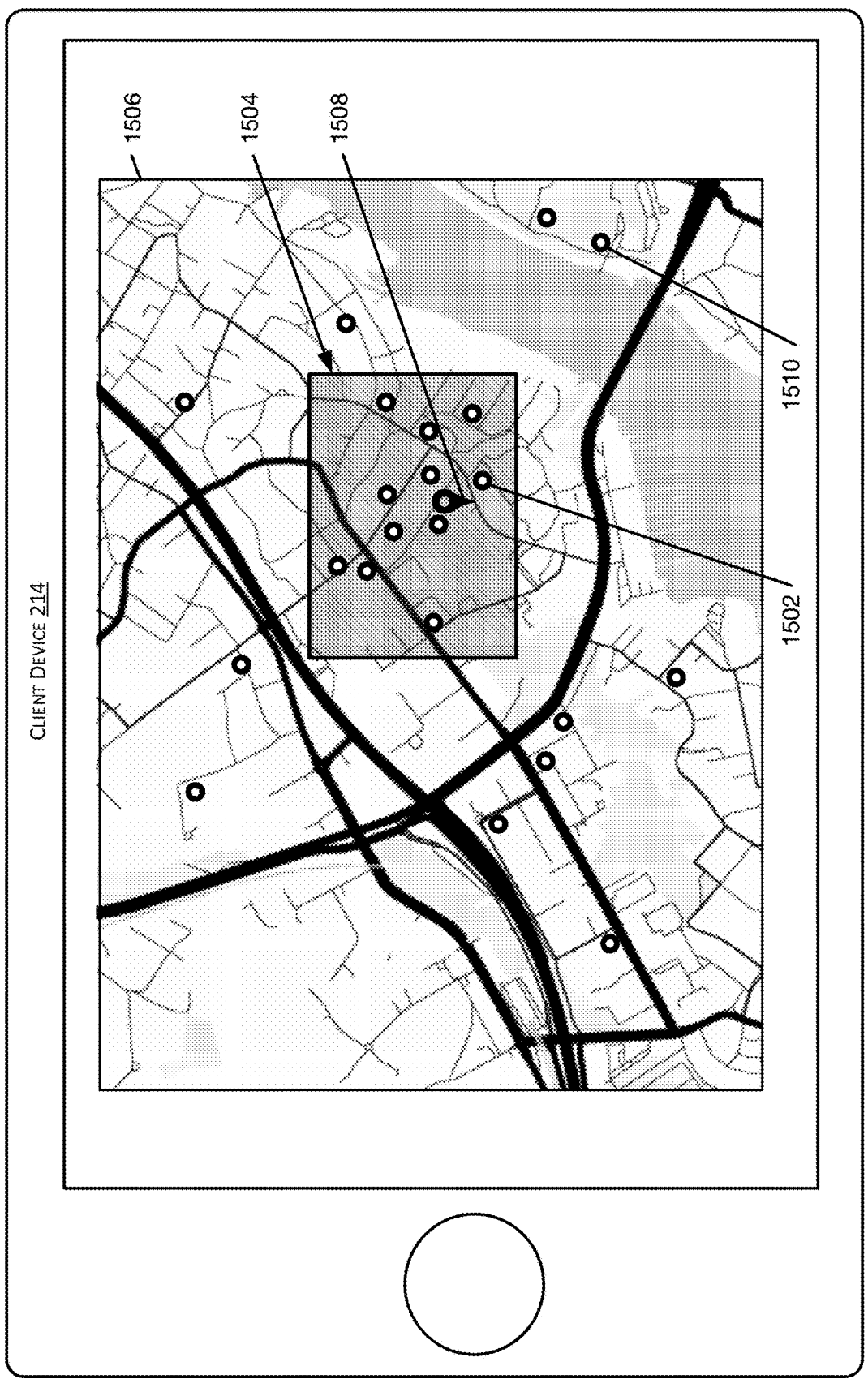
FIG. 15 illustrates an example of a geographic network of users, according to various aspects of the present disclosure.

FIG. 15 illustrates an example of a geographic network of users, according to various aspects of the present disclosure. In some examples, a geographic network may be executed by a geographic network platform, such as a geographic network platform operating on the backend server 224 and/or one or more other or additional components of the network of servers/backend devices 220. As such, the backend server 224 and/or one or more other or additional components of the network of servers/backend devices 220 may store and/or maintain the components, features, and/or functionality of the geographic network platform. In some examples, and without limitation, the geographic network may be a neighborhood-oriented or local-oriented network, such as Neighborhoods® or Nextdoor®. In other examples, and without limitation, the geographic network may be a social media network (or a feature within a social media network), such as Facebook®, Twitter®, or Instagram®.

The geographic network platform may enable users of the geographic network to share content (e.g., image data (e.g., image data 406), audio data (e.g., audio data 408), text data (e.g., text data 414), input data (e.g., input data 410), motion data (e.g., motion data 412), and/or other data from the user's A/V device (e.g., the A/V device 210) and/or the user's client device (e.g., the client device(s) 214, 216)) with other users of the geographic network. The geographic network platform may allow users that are located within geographic area(s) to register with the geographic network to access content shared by other users within the geographic area(s). As such, the content that a particular user may have access to may be based on the user's location (e.g., the location of the user's residence, the location of one or more A/V devices associated with the user, the current location of the user (e.g., based on a location of the user's client device), etc.) and/or the location of the electronic device(s) (e.g., the A/V device 210, the client device(s) 214, 216, etc.) that generated the content. For example, users that are located in a geographic area may share content with other users in the geographic area and/or in a similar geographic area, and/or users may view content shared by other users that are located within his or her geographic area (e.g., a neighborhood, a town, a city, a state, a user-defined area, etc.) and/or in a similar geographic area.

In some examples, a user may register with the geographic network platform if the user has an A/V device and/or has an application (e.g., a mobile application, a web application, etc.) associated with the geographic network installed on and/or running on his or her client device. When registering for the geographic network, the user may register, or be required to register, with respect to a geographic area. In some examples, a user may register with the geographic area of the geographic network if the user's residence is located within the geographic area and/or the user has A/V device(s) located (e.g., installed) within the geographic area. In some examples, a user may be a member to one or more geographic areas of the geographic network.

In some examples, a user may be verified to a geographic area of the geographic network that the user is requesting to join. For example, to determine if the user is actually located within a geographic area, GNSS data of the user's A/V device may be used (e.g., during and/or after installation, provisioning, and/or setup of the A/V device). As another example, to determine if the user is actually located within a geographic area, GNSS data of the user's client device may be compared (e.g., over a period time) to an address input by the user. For example, if the user inputs an address, and the location of the user's client device is within a threshold proximity to the address (e.g., over the period of time, which may be, for example and without limitation, four hours, six hours, twenty-four hours, two days, etc.), the user may be verified to the address, and thus verified to the geographic area of the geographic network. A verified user may have full access to features of the geographic network, and/or full access to content shared by other users of the geographic network in the geographic area that the user is verified for. Non-verified users may have limited access to features and/or content of the geographic network. For example, non-verified users may only be able to view content, but not interact with (e.g., comment on, like, share, etc.) the content, and/or may not be able to share his or her own content. A single user may be a verified user of one geographic area of the geographic network and may be a non-verified user of a second geographic area of the geographic network.

In some examples, a provider of the geographic network platform (e.g., hosted on the backend server 224) may receive shared content from any user that is associated with the provider and/or the geographic network, but each individual user may only share content with and/or view content shared from other users within a geographic area of the user. As a result, content provided to and/or made available to each user by the geographic network platform may be unique to each user (e.g., based on the unique location of the user's residence and/or the user's A/V devices, etc.), and/or unique to a geographic area (e.g., all users associated with a geographic area of the geographic network).

In one illustration of a geographic network, the geographic network platform may facilitate a content feed to allows a user of the geographic network to post videos, photos, text, and/or other data to alert other members of possible suspicious activity in a geographic area. Additionally, or alternatively, news items, police sourced information, and/or other third-party data may be posted to the content feed of the geographic network (e.g., by the users and/or by the provider of the geographic network (e.g., the host of the geographic network platform)), that are related to crime and/or safety of the geographic area (e.g., restricting news items to those related to the geographic area). Members of the geographic network may rate, like, dislike, comment, download, share an existing post/alert with others, and/or upload a new post/alert to the content feed to provide additional information for other users.

A geographic area of a geographic network may be defined using various methods. For example, a geographic area may be associated with one or more neighborhoods, towns, zip codes, cities, states, or countries. In another example, a geographic area may be determined by the backend server 224 based on grouping a particular number of A/V devices or client devices about a particular vicinity. In a further example, a user may customize a geographic area (e.g., by drawing the geographic area on a map, by providing a radius from the user's property for which the user would like to view shared content, by positioning a boundary (e.g., using markers to define a polygon) of the geographic area over a map, etc.). In such an example, the user's geographic area may be unique to the user.

For example, and as illustrated in FIG. 15, a portion of the geographic network is shown. With reference to FIG. 15, and during a setup or registration process with the geographic network, the location 1508 to be associated with the user of the client device 214 may be determined (e.g., based on an address being input by the user, based on a determination of the location of the client device 214, based on the location of the A/V device(s) 210 associated with the user (in examples where the user 214 has one or more A/V devices 210), etc.). In some examples, the user may then be associated with the geographic area 1504 of the geographic network, such as based on the neighborhood, town, city, zip code, state, country, or other area that the user is located. In one example, the geographic area 1504 may be the town that the location 1508 associated with the user is located. In other examples, the user may define, on the map 1506, the geographic area 1504 of the geographic network that the user wishes to have access to content, which may include the location 1508 associated with the user. To define the geographic area 1504, the user may overlay a predefined shape on the map 1506 (e.g., a rectangle, as shown, a circle, a triangle, a square, a polygon, etc.), may position any number of vertices to define a polygon on the map 1506, may define a radius about the location 1508 associated with the user, may draw the geographic area 1504 on the map, etc. The geographic network may limit the size of the geographic area 1504 for the user. The size may be limited to a maximum distance in any direction from the location 1508 (e.g., a radius) associated with the user of less than, for example and without limitation, two miles, five miles, ten miles, fifteen miles, fifty miles, or the like.

Although the geographic area 1504 includes the geographic area 1504 of the geographic network that the user may desire to view content from, the content shared by the user may be shared with a larger, smaller, and/or different geographic area of the geographic network than the geographic area 1504. For example, the geographic area 1504 may include the geographic area that the user can view content in, but any users located within the entire portion of the map 1506 displayed on the client device 214 may be able to view content shared by the user of the client device 214 (e.g., depending on the geographic areas defined by and/or associated with the other users located within the portion of the map 1506). For example, users of the geographic network having associated location(s) 1510 outside of the geographic area 1504 may be able to view the content shared by the user of the client device 214, but the user of the client device 214 may not be able to view, or may choose not to view (e.g., by defining the geographic area 1504 that does not include the locations 1510), the content shared by the user(s) associated with the location(s) 1510. In other examples, the geographic area 1504 that the user of the client device 214 desires to view content from may also be the same geographic area 1504 that users can view content shared by the user of the client device 214. For example, where the geographic area 1504 is a town, each of the users located within the town may only be able to view and share content with each other user located in the town. As another example, where the geographic area 1504 is defined by the user of the client device 214, the user of the client device 214 may only be able to view content by the users who are located within the geographic area 1504 and the users within the geographic area 1504 may be the only users that can view content shared by the user of the client device 214.

With further reference to FIG. 15, and during use of the geographic network platform by the user of the client device 214, the user may access a GUI on the client device 214 (e.g., within a mobile or web application). The user may desire to view shared content from users of the geographic area 1504 of the geographic network. As such, the icons illustrating the locations 1502 may be included within the geographic area 1502 because data generated by client devices and/or A/V devices of users associated with the locations 1502 may be available for viewing. In some examples, the icons may be included because the content has not yet been viewed by the user, because the content was shared within a time period (e.g., within the last day, within the last two days, within the last week, etc.), and/or based on other criteria. The user may select the icons, and in response, the user may receive the content (e.g., the image data, audio data, the text data, etc.) associated with the icons (e.g., from the backend server 224). Although illustrated as icons on a map, in some examples, the content may additionally, or alternatively, be provided as a list. For example, the list may include text describing the content (e.g., date, time, description, location (e.g., as a selectable icon, that when selected may allow the user to view the location on a map), etc.), and individual listings may be selectable, similar to the icons on the map 1506.

Figure 16:
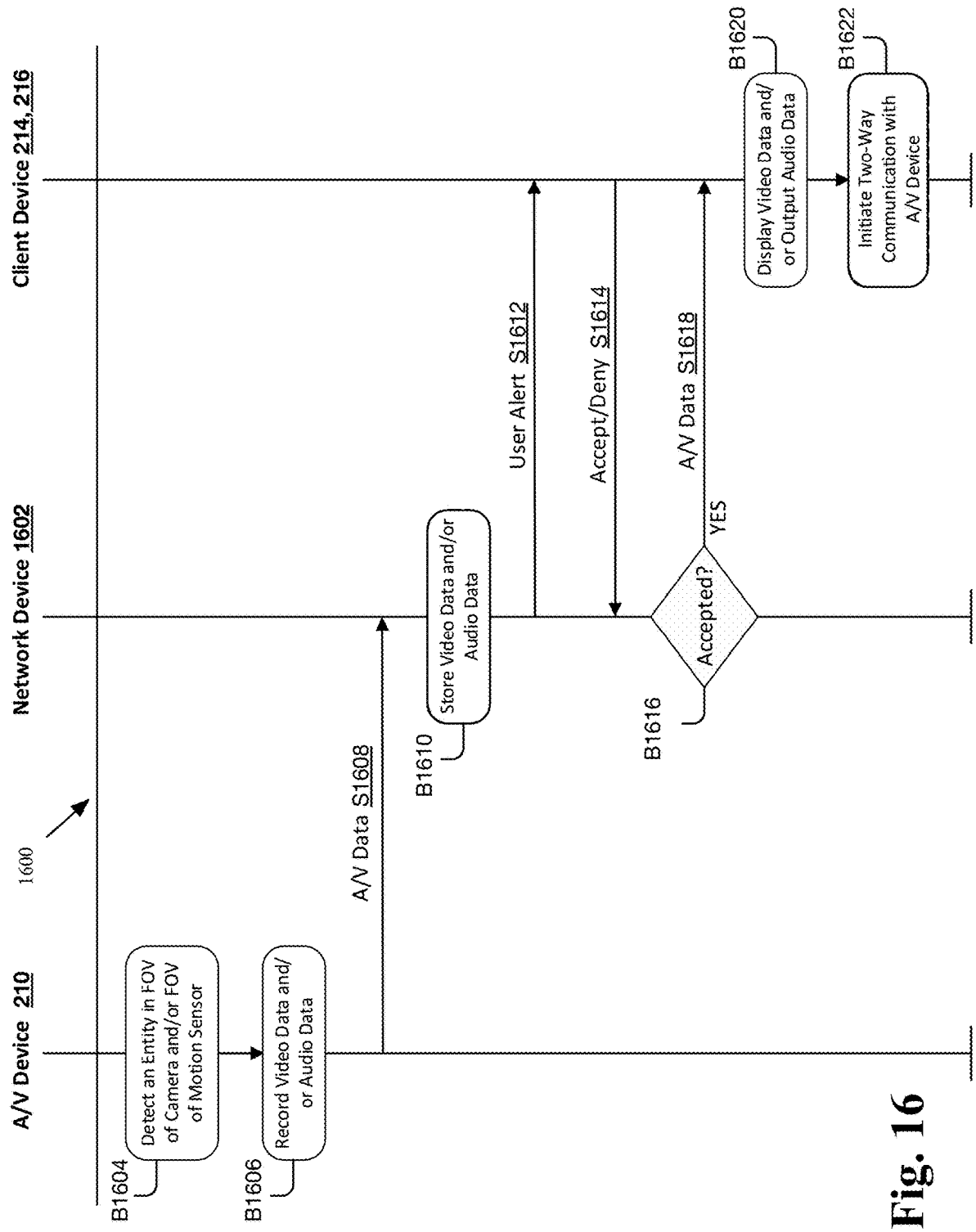
FIG. 16 is a signal diagram of a process for streaming and/or storing A/V content from an A/V recording and communication device, according to various aspects of the present disclosure.

FIG. 16 is a signal diagram of a process 1600 for streaming and storing A/V content from the A/V device 210, according to various aspects of the present disclosure. The network device 1602 may include one or more of the hub device 202, the VA device 208, and/or any of the components of the network(s) of servers/backend devices 220 (e.g., the backend server 224, the backend API 226, the storage devices 222, etc.).

The process 1600, at block B1604, detects an object in a field of view of a camera and/or a field of view of a motion sensor. For example, the A/V device 210 may detect the presence of an object within a field of view of view of the motion sensor(s) 326 (e.g., a motion sensor field of view) and/or a field of view of the camera 314 (e.g., a camera field of view). To detect motion using the motion sensor(s) 326, the data type (e.g., voltage for PIR sensors) from the output signal of the motion sensor(s) 326 may be analyzed, by the processor(s) 310 of the A/V device 210, to determine whether the output signal is indicative of motion of an object that should prompt the recording of the image data 406 and/or audio data 408 at block B1606 and signal S1608. To detect motion using the camera 314, the processor(s) 310 of the A/V device 210 may analyze the image data 406 by performing, for example, a frame by frame comparison of a change in pixels, to determine whether the image data 406 is indicative of motion of an object that should prompt the recording and transmission of image data 406 and/or audio data 408 at block B1606 and signal S1608.

The process 1600, at block B1606, records video data and/or audio data. For example, the processor(s) 310 of the A/V device 210 may cause the camera 314 to begin generating the image data 406 and/or the microphone(s) 328 to being recording the audio data 408.

The process 1600, at signal S1608, transmits the video data and/or the audio data to a network device 1602. For example, the processor(s) 310 of the A/V device 210, using the communication module 312, may transmit the image data 406 and/or the audio data 408 to the network device 1602. In response, the network device 1602 may receive, by respective processor(s) and using respective communication module(s), the image data 406 and/or the audio data 408. In some embodiments, the image data 406 and/or the audio data 408 is transmitted to the hub device 202 and/or the VA device 208, and the hub device 202 and/or the VA device 208 may transmit (or forward) the image data 406 and/or the audio data 408 to one or more components of the network(s) of servers/backend devices 220. In either embodiment, the network device 1602 may transmit the image data 406 and/or the audio data 408 to a client device(s) 214, 216. In other embodiments, the image data 406 and/or the audio data 408 may be transmitted to the hub device 202 and/or the VA device 208, and the hub device 202 and/or the VA device 208 may transmit (or forward) the image data 406 and/or the audio data 408 to the client device(s) 214, 216. Still, in some embodiments, the image data 406 and/or the audio data 408 may be transmitted directly to the client device(s) 214, 216 from the A/V device 210.

The process 1600, at block B1610, stores the video data and/or the audio data. For example, the network device 1602 may store the image data 406 and/or the audio data 408. The image data 406 and/or the audio data 408 may be stored for future access by the user(s) of the A/V device 210 (e.g., as Cloud storage). In some embodiments, the A/V device 210 may store the image data 406 and/or the audio data 408 locally (e.g., in the memory 402). In some embodiments, the image data 406 and/or the audio data 408 may not be stored, except during buffering, compression, and/or live (or near-live) streaming of the image data 406 and/or the audio data 408 to the client device(s) 214, 216. In such embodiments, at the conclusion of a motion event (e.g., when an object is no longer in the camera field of view and/or the motion sensor field of view), the video data and/or the audio data may be deleted from the network device 1602.

The process 1600, at signal S1612, transmits a message to the client device. For example, the network device 1602 may transmit, by the respective processor(s) and using the respective communication module(s), a message 416 to the client device(s) 214, 216. In some embodiments, the message 416 may be generated and transmitted, by the processor(s) 310 and using the communication module 312, directly to the client device(s) 214, 216 from the A/V device 210. The message 416 may be a notification (e.g., a push notification, a message (e.g., an SMS message), an email, a phone call, a signal, and/or another type of message. The message 416 may be configured to provide a user of the client device(s) 214, 216 with an indication that an object is present at the A/V device 210. In some embodiments, the message 416 may be informative as to the type of motion detected and/or object present at the A/V device 210. For example, if a person, an animal, a parcel, or a vehicle is present, the message 416 may include an indication of such. As another example, if the person and/or animal detected are known to be dangerous and/or are acting suspicious (as determined using computer vision processing, image processing, behavioral analysis, third party source(s), etc.), the message 416 may include an indication of such.

The process 1600, at signal S1614, transmits an acceptance or denial of the message. For example, the client device(s) 214, 216 may transmit, by the processor(s) 702 and using the communication module 710, an acceptance or denial of the message 416. In various embodiments, acceptance of the message 416 includes an acknowledgement of receipt of the message 416 from the client device(s) 214, 216. In yet other embodiments, the acceptance includes the user interacting with (e.g., selecting through a user interface a user interface element of a modal window displayed by a display device the client device(s) 214, 216) the message 416. Furthermore, denial of the message 416 may include a variety of different actions and/or information. In one example, a denial includes a failure of the client device(s) 214, 216 to provide a response to the message 416 within an interval of time. In yet another example, the denial includes the user interacting with the message 416 by at least selecting an "ignore" user interface element of a GUI 718 of the client device(s) 214, 216. In response, the hub device 202, the VA device 208, and/or one or more components of the network(s) of servers/backend devices 220 may receive, by the respective processors and using the respective communication modules, the acceptance or denial of the message 416 from the client device(s) 214, 216.

The process 1600, at block B1616, determines whether the message was accepted or denied. For example, the network device 1602 may determine, by the respective processors, whether the message 416 was accepted or denied. In some embodiments, the processor(s) 310 of the A/V device 210, using the communication module 312, may determine whether the message 416 was accepted or denied (e.g., in embodiments where the A/V device 210 and the client device(s) 214, 216 communicate directly). When the message 416 is denied, the process 1600 may end, or another transmission type of the message may be generated (e.g., if a user denies a push notification, an SMS message may be transmitted). When the message 416 is accepted, the image data 406 and/or the audio data 408 may be transmitted to the client device(s) 214, 216 that accepted the message 416.

The process 1600, at signal S1618, transmits the video data and/or the audio data to the client device(s) 214, 216. For example, network device 1602, by the respective processor(s) and using the respective communication module(s), may transmit the image data 406 and/or the audio data 408 to the client device(s) 214, 216. In response, the client device(s) 214, 216, by the processor(s) 702 and using the communication module 710, may receive the image data 406 and/or the audio data 408. In some embodiments, the image data 406 and/or the audio data 408 may be transmitted by the processor(s) 310 of the A/V device 210, using the communication module 312, directly to the client device(s) 214, 216.

The process 1600, at block B1620, displays the video data and/or outputs the audio data. For example, the processor(s) of the client device(s) 214, 216 may cause display, on the display 716 of the client device(s) 214, 216, the image data 406 and/or may cause output, by the speaker(s) 708 of the client device(s) 214, 216, the audio data 408. In addition to displaying the image data 406 and/or outputting the audio data 408, a GUI 718 may be displayed on the client device(s) 214, 216 that may allow a user of the client device(s) 214, 216 to perform one more actions. The one or more actions may include outputting a siren, or alarm, by selecting a siren/alarm icon, changing camera settings (e.g., pan, tilt, zoom, brightness, contrast, etc.) by selecting one or more camera settings icons, activating one or more modes by selecting a mode activation icon (e.g., for activating a parcel protection mode for monitoring a package in the camera field of view), arming or disarming a security system by selecting an arm/disarm icon, unlocking a door by selecting a door lock icon, etc. In some embodiments, the GUI 718 may further include a talk icon for initiating a two-way communication session between the client device(s) 214, 216 and the A/V device 210, as described below with respect to block B1622.

The process 1600, at block B1622, initiates a two-way communication with the A/V device. For example, the processor(s) 702 of the client device(s) 214, 216, using the communication module 710, may initiate a two-way communication session with the A/V device 210. In response, the A/V device 210 and/or the network device 1602 may receive the two-way communication request from the client device(s) 214, 216. Once the two-way communication session is established, the voice/sound input at the client device(s) 214, 216, as captured by the microphone(s) 706 of the client device(s) 214, 216, may be transmitted as audio data to the A/V device 210 for output by the speaker(s) 330. Additionally, the voice/sound input at the A/V device 210, as captured by the microphone(s) 328 of the A/V device 210, may be transmitted as audio data 408 to the client device 214, 216 for output by the speaker(s) 708 of the client device(s) 214, 216.

Figure 17:
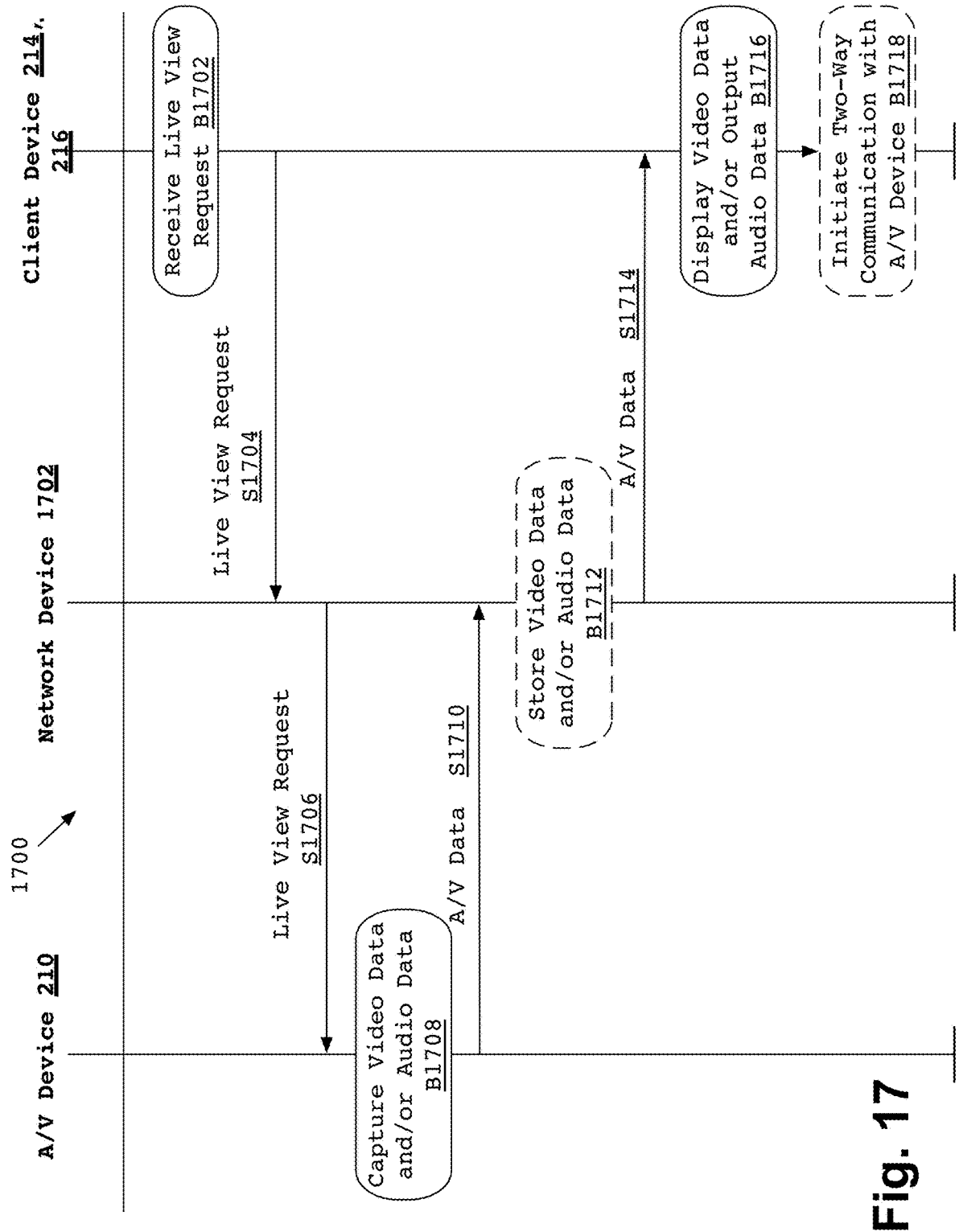
FIG. 17 is a signal diagram of a process for initiating a video-on-demand session for A/V content from an A/V recording and communication device, according to various aspects of the present disclosure.

FIG. 17 is a signal diagram of a process 1700 for initiating a video-on-demand session for A/V content from an A/V device 210, according to various aspects of the present disclosure. The network device 1702 may include one or more of the hub device 202, the VA device 208, and/or any of the components of the network(s) of servers/backend devices 220 (e.g., the backend server 224, the backend API 226, the storage devices 222, etc.).

The process 1700, at block B1702, receives a live view request. For example, the processor(s) 702 of the client device 214, 216 may receive a live view request from a user of the client device 214, 216. The live view request may include an input to user interface (e.g., the display 716, such as within a GUI 718 on the display 716, one or more physical buttons of the client device 214, 216, etc.).

The process 1700, at signal S1704, transmits a live view request. For example, the live request may be transmitted, by the processor(s) 702 and using a communication module 710 of the client device 214, 216, to the network device 1702. In response, network device 1702 may receive, by the respective processor(s) and using the respective communication module(s), the live view request. In some embodiments, the live view request may be transmitted directly to the A/V device 210 from the client device 214, 216.

The process 1700, at signal S1706, transmits the live request. For example, network device 1702 may transmit (or forward), by the respective processor(s) and using the respective communication module(s), the live view request to the A/V device 210. In response, the processor(s) 310 of the A/V device 210, using the communication module 312, may receive the live view request.

The process 1700, at block B1708, captures video data and/or audio data. For example, in response to receiving the live view request, the processor(s) 310 of the A/V device 210 may cause the camera 314 to record the image data 406 and/or the microphone(s) 328 to record the audio data 408.

The process 1700, at signal S1710, transmits the video data and/or the audio data. This process may be similar to that of signal S1608 of the process 1600, described above.

The process 1700, at block B1712, stores the video data and/or the audio data. This process may be similar to that of block B1610 of the process 1600, described above.

The process 1700, at block S1714, transmits the video data and/or the audio data to the client device. This process may be similar to that of signal S1618 of the process 1600, described above.

The process 1700, at block B1716, displays the video data and/or outputs the audio data. This process may be similar to that of block B1620 of the process 1600, described above.

The process 1700, at block B1718, initiates two-way communication with the A/V device 210. This process may be similar to that of block B1622 of the process 1600, described above.

Figure 18:
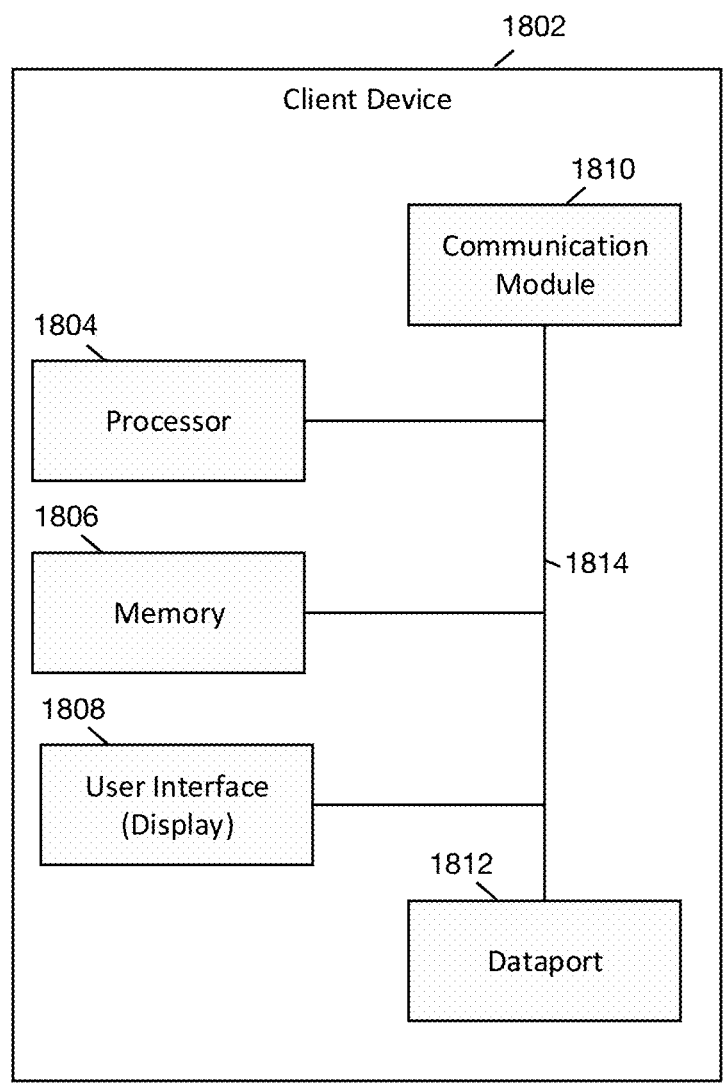
FIG. 18 is a functional block diagram of a client device on which the present embodiments may be implemented, according to various aspects of the present disclosure.

FIG. 18 is a functional block diagram of a client device 1802 on which the present embodiments may be implemented, according to various aspects of the present disclosure. The client device(s) 214, 216 described with reference to FIG. 2 may include some or all of the components and/or functionality of the client device 1802. The client device 1802 may comprise, for example, a smartphone.

With reference to FIG. 18, the client device 1802 includes a processor 1804, a memory 1806, a user interface 1808, a communication module 1810, and a dataport 1812. These components are communicatively coupled together by an interconnect bus 1814. The processor 1804 may include any processor used in smartphones and/or portable computing devices, such as an ARM processor (a processor based on the RISC (reduced instruction set computer) architecture developed by Advanced RISC Machines (ARM)). In some embodiments, the processor 2004 may include one or more other processors, such as one or more conventional microprocessors, and/or one or more supplementary co-processors, such as math co-processors.

The memory 1806 may include both operating memory, such as random-access memory (RAM), as well as data storage, such as read-only memory (ROM), hard drives, flash memory, or any other suitable memory/storage element. The memory 1806 may include removable memory elements, such as a CompactFlash card, a MultiMediaCard (MMC), and/or a Secure Digital (SD) card. In some embodiments, the memory 2006 may comprise a combination of magnetic, optical, and/or semiconductor memory, and may include, for example, RAM, ROM, flash drive, and/or a hard disk or drive. The processor 1804 and the memory 1806 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 1804 may be connected to the memory 1806 via the dataport 1812.

The user interface 1808 may include any user interface or presentation elements suitable for a smartphone and/or a portable computing device, such as a keypad, a display screen, a touchscreen, a microphone, and a speaker. The communication module 1810 is configured to handle communication links between the client device 1802 and other, external devices or receivers, and to route incoming/outgoing data appropriately. For example, inbound data from the dataport 1812 may be routed through the communication module 1810 before being directed to the processor 1804, and outbound data from the processor 1804 may be routed through the communication module 1810 before being directed to the dataport 1812. The communication module 1810 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 1812 may be any type of connector used for physically interfacing with a smartphone and/or a portable computing device, such as a mini-USB port or an IPHONE®/IPOD® 30-pin connector or LIGHTNING® connector. In other embodiments, the dataport 1812 may include multiple communication channels for simultaneous communication with, for example, other processors, servers, and/or client terminals.

The memory 1806 may store instructions for communicating with other systems, such as a computer. The memory 1806 may store, for example, a program (e.g., computer program code) adapted to direct the processor 1804 in accordance with the present embodiments. The instructions also may include program elements, such as an operating system. While execution of sequences of instructions in the program causes the processor 2204 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 19:
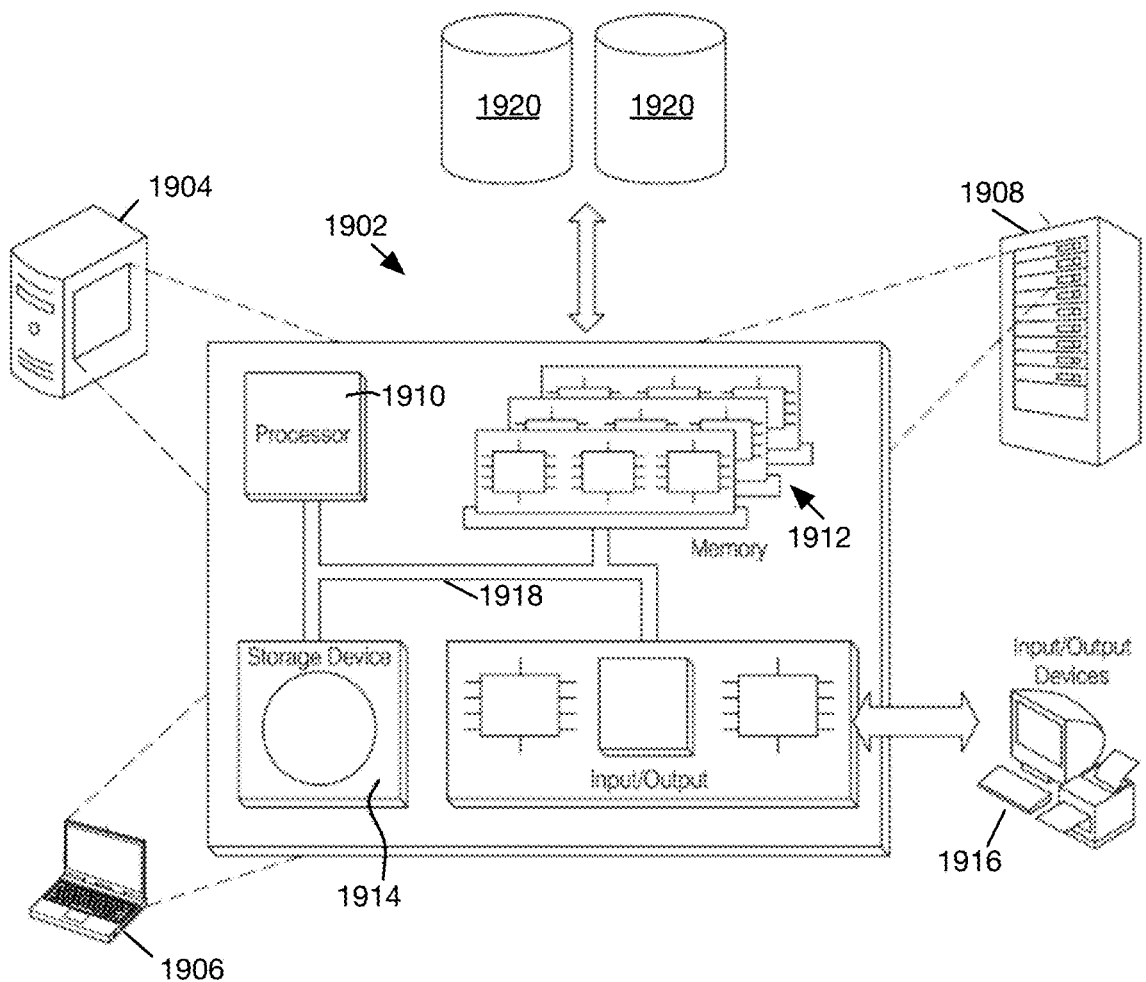
FIG. 19 is a functional block diagram of a general-purpose computing system on which the present embodiments may be implemented, according to various aspects of the present disclosure.

FIG. 19 is a functional block diagram of a general-purpose computing system on which the present embodiments may be implemented, according to various aspects of the present disclosure. The computer system 1902 may be embodied in at least one of a personal computer (also referred to as a desktop computer) 1904, a portable computer (also referred to as a laptop or notebook computer) 1906, and/or a server 1908 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1902 may execute at least some of the operations described above. The computer system 2102 may include at least one processor 1910, memory 1912, at least one storage device 1914, and input/output (I/O) devices 1916. Some or all of the components 1910, 1912, 1914, 1916 may be interconnected via a system bus 1918. The processor 1910 may be single- or multi-threaded and may have one or more cores. The processor 1910 execute instructions, such as those stored in the memory 1912 and/or in the storage device 1914. Information may be received and output using one or more I/O devices 1916.

The memory 1912 may store information, and may be a computer-readable medium, such as volatile or non-volatile memory. The storage device(s) 1914 may provide storage for the system 2102 and, in some embodiments, may be a computer-readable medium. In various aspects, the storage device(s) 1914 may be a flash memory device, a hard disk device, an optical disk device, a tape device, or any other type of storage device.

The I/O devices 1916 may provide input/output operations for the system 1902. The I/O devices 1916 may include a keyboard, a pointing device, and/or a microphone. The I/O devices 1916 may further include a display unit for displaying graphical user interfaces, a speaker, and/or a printer. External data may be stored in one or more accessible external databases 1920.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

In a first aspect, a method for requesting help during an emergency event comprises: receiving data generated by an audio/video recording and communication device (A/V device), the data representing video of the emergency event; processing the data to display, on a display area of a display of a client device, the video of the emergency event; receiving, by the client device and via the display, an input; in response to receiving the input, displaying a selectable user interface (UI) item at a first location on the display, the first location overlying the display area of the display; receiving an input at the first location on the display; in response to receiving the input at the first location on the display: transmitting, to a network, and for further transmission to at least one law enforcement agency, first data representative of a link to the video of the emergency event, second data representative of a request for help, and third data representative of a location of the A/V device; and transmitting, to the network, and for further transmission to one or more other client devices associated with a geographic area that includes the location of the A/V device, fourth data representative of the link, fifth data representative of the request for help, and sixth data representative of the location.

An embodiment of the first aspect further comprises: before transmitting the second data representative of the request for help or the fifth data representative of the request for help: displaying at a second location on the display, a message describing the emergency event; receiving an input at the second location on the display; receiving further input modifying the message; modifying the message based on the further input to generate a modified message; and transmitting seventh data representative of the modified message to the network for further transmission to the at least one law enforcement agency and/or the one or more other client devices.

Another embodiment of the first aspect further comprises: in response to receiving the input at the first location on the display, transmitting seventh data representative of the link and the request for help to the network for further transmission to a security monitoring center monitoring an alarm system installed at the location.

Another embodiment of the first aspect further comprises: in response to receiving the input at the first location on the display, activating another A/V device at the location to record video.

Another embodiment of the first aspect further comprises: in response to receiving the input at the first location on the display, sending a text message to an emergency telephone number, the text message comprising seventh data representative of the link, eighth data representative of the request for help, and ninth data representative of the location of the A/V device.

Another embodiment of the first aspect further comprises: providing an exact address of a property where the A/V device is installed as the third data representative of the location of the A/V device for transmission to the at least one law enforcement agency; and providing an approximate location of the property as the sixth data representative of the location for transmission to the one or more other client devices.

In a second aspect, a method for requesting help during an emergency event comprises: receiving data generated by an audio/video recording and communication device (A/V device), the data representing video of the emergency event; processing the data to display, on a display area of a display of a client device, the video of the emergency event and a first selectable user interface (UI) item at a first location on the display, the first location overlying the display area of the display; in response to receiving an input at the first location on the display, displaying, at a second location on the display, a message for requesting help, and displaying, at a third location on the display, a second selectable UI item, the third location overlying the display area of the display; receiving an input at the second location on the display; receiving further input modifying the message;

receiving an input at the third location on the display; and in response to receiving the input at the third location on the display, transmitting, to a network, and for further transmission to at least one law enforcement agency, first data representative of a link to the video of the emergency event, second data representative of the modified message, and third data representative of a location of the A/V device.

An embodiment of the second aspect further comprises: in response to receiving the input at the third location on the display, transmitting, to the network, and for further transmission to a security monitoring center monitoring an alarm system installed at the location, fourth data representative of the link, fifth data representative of the modified message, and sixth data representative of the location.

Another embodiment of the second aspect further comprises: in response to receiving the input at the third location on the display, transmitting, to the network, and for providing moderation and further transmission to one or more pre-designated client devices, fourth data representative of the link, fifth data representative of the modified message, and sixth data representative of the location.

Another embodiment of the second aspect further comprises: prior to receiving the data generated by the A/V device, selecting a geographic area that includes the location of the A/V device; and assigning one or more other client devices associated with the geographic area as the pre-designated client devices.

Another embodiment of the second aspect further comprises: prior to receiving the data generated by the A/V device, selecting a geographic area that includes the location of the A/v device; and assigning one or more other client devices outside the geographic area as the pre-designated client devices.

Another embodiment of the second aspect further comprises: in response to receiving the input at the third location on the display, transmitting, to the network, and for further transmission as a push notification to one or more other client devices associated with a geographic area that includes the location of the A/V device, fourth data representative of the link, fifth data representative of the modified message, and sixth data representative of the location.

In an embodiment of the second aspect, the A/V device is a first A/V device, the method further comprises, in response to receiving the input at the third location on the display, activating a second A/V device at the location to record video.

Another embodiment of the second aspect further comprises: after activating the second A/V device, receiving data generated by the second A/V device, the data representing video of the emergency event; and processing the data from the first and the second A/V devices to simultaneously display, on the display area of the display of the client device, the video of the emergency event received from the first and second A/V devices.

In a third aspect, a method for requesting help during an emergency event, the method comprises: receiving data generated by an audio/video recording and communication device (A/V device), the data representing video of the emergency event; processing the data to display, on a display area of a display of a client device, the video of the emergency event; receiving, by the client device and via the display, an input; in response to receiving the input, displaying a selectable user interface (UI) item at a first location on the display, the first location overlying the display area of the display; receiving an input at the first location on the display; in response to receiving the input at the first location on the display, transmitting, to a network, and for further transmission to at least one law enforcement agency, first data representative of a link to the video of the emergency event, second data representative of a default message requesting help, and third data representative of a location of the A/V device; displaying, on a second display area of the display of the client device, the default message requesting help; receiving one or more inputs modifying the message to create a modified message requesting help; displaying options for providing an exact address and an approximate location for a location of the A/V device; in response to receiving a selection of one of the options, transmitting, to the network, and for further transmission to one or more other client devices associated with a geographic area that includes the location of the A/V device, fourth data representative of the link, fifth data representative of the modified message requesting help, and sixth data representative of the location of the A/V device.

An embodiment of the third aspect further comprises: in response to receiving a selection of one of the options, transmitting, to the network, and for further transmission to the at least one law enforcement agency, seventh data representative of the link, eighth data representative of the modified message requesting help, and ninth data representative of the location of the A/V device.

Another embodiment of the third aspect further comprises: when the option for providing the approximate location of the A/V device is selected, in response to receiving of the selection of the option for providing the approximate location of the A/V device: transmitting, to the other client devices associated with the geographic area, the approximate location of the A/V device as the sixth data representative of the location of the A/V device; and transmitting, to the law enforcement agency, the exact address of the A/V device location as the ninth data representative of the location of the A/V device.

Another embodiment of the third aspect further comprises: when the option for providing the exact address of the A/V device location is selected, in response to receiving of the selection of the option for providing the exact address of the A/V device location: transmitting, to the other client devices associated with the geographic area, the exact address of the A/V device location as the sixth data representative of the location of the A/V device; and transmitting, to the law enforcement agency, the exact address of the A/V device location as the ninth data representative of the location of the A/V device.

In an embodiment of the third aspect, the A/V device is a first A/V device, the method further comprises: in response to receiving the selection of one of the options, activating a second A/V device at the location to record video; receiving data generated by the second A/V device, the data representing video of the emergency event; and processing the data from the first and the second A/V devices to simultaneously display, on the display area of the display of the client device, the video of the emergency event received from the first and second A/V devices.

Another embodiment of the third aspect further comprises: in response to receiving an input at the first location on the display: sending a text message to an emergency telephone number, the text message comprising seventh data representative of the link, eighth data representative of the default message requesting help, and ninth data representative of the exact address of the A/V device location.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method comprising:
   receiving, at a client device, video of an event;
   displaying, on a display of a client device, the video of the event;
   receiving, by the client device, a first input;
   in response to receiving the first input, displaying a selectable user interface (UI) item at a first location on the display, the selectable UI item at the first location overlying the video of the event;
receiving a second input corresponding to the first location on the display;
in response to receiving the second input:
   transmitting, to a first device, first data representative of a Uniform Resource Locator (URL) to the video of the event, second data representative of a request for help, and third data representative of a location of a camera that captured the video of the event; and
   transmitting, to a second device, fourth data representative of the URL, fifth data representative of the request for help, and sixth data representative of the location of the camera.

2. The method of claim 1, wherein the first device is associated with a law enforcement agency, wherein the second device is a designated client device assignable by the user, wherein transmitting fourth data comprises generating a short message service (SMS) message.

3. The method of claim 1 further comprising, before transmitting the second data representative of the request for help or the fifth data representative of the request for help:
   displaying at a second location on the display, a message describing the event;
   receiving a third input modifying the message;
   modifying the message based on the third input to generate a modified message; and
   transmitting seventh data representative of the modified message to the first device or the second device.

4. The method of claim 1 further comprising, in response to receiving the second input, transmitting seventh data representative of the URL and eighth data representative of the request for help to a security monitoring center monitoring an alarm system installed at the location of the camera.

5. The method of claim 1 further comprising, in response to receiving the second input, activating another camera coupled to a Local Area Network (LAN) of the camera to record additional video.

6. The method of claim 1 further comprising:
   in response to receiving the second input, sending a text message to an emergency telephone number, the text message comprising seventh data representative of the URL, eighth data representative of the request for help, and ninth data representative of the location of the camera.

7. The method of claim 1 further comprising:
   sending a street address of a property where the camera is installed as the third data representative of the location of the camera for transmission to the first device, the first device being associated with a law enforcement agency; and
   sending an approximate location of the property as the sixth data representative of the location of the camera for transmission to the second device, the second device being another client device.

8. An apparatus comprising:
at least one processor; and
memory storing computer-executable instructions that, when executed by the at least one processor, cause the apparatus to:
   receive video generated by a camera;
   display, on a display, the video;
   in response to receiving a first input, display an icon at a first location on the display of the video;
   receiving a second input of the icon being selected;
   in response to receiving the second input:
      transmitting, to a first device associated with a law enforcement agency, first data representative of a Uniform Resource Locator (URL) to the video, second data representative of a request for help, and third data representative of a location of the camera that captured the video; and
      transmitting, to a second device associated with a geographic area that includes the location of the camera, fourth data representative of the URL, fifth data representative of the request for help, and sixth data representative of the location of the camera.

9. The apparatus of claim 8, wherein the computer-executable instructions comprise further instructions that, when executed by the at least one processor, further cause the apparatus to:
   display at a second location on the display, a message describing the video captured by the camera;
   receive third input to modify the message;
   modify the message to generate a modified message; and
   transmit seventh data representative of the modified message to the first device or the second device.

10. The apparatus of claim 8, wherein the computer-executable instructions comprise further instructions that, when executed by the at least one processor, further cause the apparatus to:
   in response to receiving the second input, transmit seventh data representative of the URL and the request for help to a security monitoring center monitoring an alarm system installed at the location of the camera.

11. The apparatus of claim 8, wherein the computer-executable instructions comprise further instructions that, when executed by the at least one processor, further cause the apparatus to:
   in response to receiving the second input, activate another camera coupled to a Local Area Network (LAN) of the camera to record additional video.

12. The apparatus of claim 8, wherein the computer-executable instructions comprise further instructions that, when executed by the at least one processor, further cause the apparatus to:
   in response to receiving the second input, send a text message to an emergency telephone number, the text message comprising seventh data representative of the URL, eighth data representative of the request for help, and ninth data representative of the location of the camera.

13. The apparatus of claim 8, wherein the computer-executable instructions comprise further instructions that, when executed by the at least one processor, further cause the apparatus to:
   send a street address of a property where the camera is installed as the third data representative of the location of the camera for transmission to the first device; and
   send an approximate location of the property as the sixth data representative of the location of the camera for transmission to the second device.

14. A method comprising:
   establishing, by a client device, a communication link with an audio/video recording and communication device (A/V device);
   receiving, by the client device, streaming video from the A/V device;
   displaying, on a display of the client device, the streaming video;
   displaying a graphical user interface (GUI) element on the display with the streaming video; and in response to receiving an input associated with the GUI element, transmitting, to a first device associated with a law enforcement agency, first data representative of a Uniform Resource Locator (URL) to the streaming video, second data representative of a request for help, and third data representative of a location of the A/V recording and communication device that captured the streaming video.

15. The method of claim 14 comprising:
transmitting, to a second device associated with a geographic area that includes the location of the A/V device, fourth data representative of the URL, fifth data representative of the request for help, and sixth data representative of the location of the A/V device.

16. The method of claim 14, wherein the GUI element comprises a panic button, wherein the panic button is displayed by overlaying the panic button over the video stream.

17. The method of claim 14 further comprising, before transmitting the second data representative of the request for help:
displaying on the display, a message describing the video stream;
receiving an input to modify the message;
modifying the message based on the input to generate a modified message; and
transmitting fourth data representative of the modified message to the first device.

18. The method of claim 14 further comprising, in response to receiving the selection of the GUI element, transmitting fourth data representative of the URL and the request for help to a security monitoring center monitoring an alarm system installed at the location of the A/V recording and communication device.

19. The method of claim 14 further comprising, in response to receiving the selection of the GUI element, activating another A/V recording and communication device at the location of the A/V recording and communication device to record video.

20. The method of claim 14 further comprising:
in response to receiving the selection of the GUI element, sending a text message to an emergency telephone number, the text message comprising fourth data representative of the URL, fifth data representative of the request for help, and sixth data representative of the location of the A/V recording and communication device.

* * * * *